(12) United States Patent
Murray et al.

(10) Patent No.: US 9,459,457 B2
(45) Date of Patent: Oct. 4, 2016

(54) HEAD MOUNTED DISPLAY WITH REMOTE CONTROL

(71) Applicants: John T. Murray, Santa Cruz, CA (US); Douglas L. Michels, Santa Cruz, CA (US); Ronald D. Lachman, Northbrook, IL (US)

(72) Inventors: John T. Murray, Santa Cruz, CA (US); Douglas L. Michels, Santa Cruz, CA (US); Ronald D. Lachman, Northbrook, IL (US)

(73) Assignee: SEEBRIGHT INC., Santa Cruz, CA (US)

(*) Notice: Subject to any disclaimer, the term of this patent is extended or adjusted under 35 U.S.C. 154(b) by 158 days.

(21) Appl. No.: 14/177,208

(22) Filed: Feb. 10, 2014

(65) Prior Publication Data

US 2014/0152531 A1 Jun. 5, 2014

Related U.S. Application Data

(63) Continuation-in-part of application No. 13/667,200, filed on Nov. 2, 2012.

(60) Provisional application No. 61/830,633, filed on Jun. 3, 2013, provisional application No. 61/565,557, filed on Dec. 1, 2011.

(51) Int. Cl.
| | |
|---|---|
| *G09G 5/00* | (2006.01) |
| *G02B 27/01* | (2006.01) |
| *G06F 1/16* | (2006.01) |
| *G06F 3/01* | (2006.01) |
| *G06F 3/0482* | (2013.01) |
| *H04N 13/04* | (2006.01) |

(52) U.S. Cl.
CPC ......... *G02B 27/0172* (2013.01); *G06F 1/1632* (2013.01); *G06F 3/012* (2013.01); *G06F 3/0482* (2013.01); *H04N 13/044* (2013.01); *H04N 13/0459* (2013.01); *G06F 2200/1637* (2013.01)

(58) Field of Classification Search
CPC .... G06F 1/1632; G06F 3/012; G06F 3/0482; H04N 13/0459; H04N 13/044
USPC ................. 345/7, 8, 9; 359/13, 630
See application file for complete search history.

(56) References Cited

U.S. PATENT DOCUMENTS

| | | | |
|---|---|---|---|
| 3,798,666 A * | 3/1974 | Heller | G03B 15/00 352/131 |
| 6,931,668 B2 | 8/2005 | Dobbie et al. | |
| 8,355,671 B2 | 1/2013 | Kramer et al. | |
| 8,477,425 B2 | 7/2013 | Border et al. | |
| 2009/0073330 A1 * | 3/2009 | Viala | G06Q 10/107 349/11 |

(Continued)

OTHER PUBLICATIONS

Rolland et al., "See-Through Head Worn Displays for Mobile Augmented Reality", (Jun. 2011) University of Rochester, Rochester, NY, USA, Synopsys, Inc., Mountain View, CA, USA, 16 pp.

(Continued)

*Primary Examiner* — Towfiq Elahi
(74) *Attorney, Agent, or Firm* — Soquel Group LLC

(57) ABSTRACT

A head mounted display device that displays three dimensional images from a mobile device, which includes a strap that secures the head mounted display to the head of a viewer, a viewing assembly connected to the strap, that includes a housing, a mobile device holder, connected to the housing, a reflecting surface, connected to the housing, that reflects images displayed by the mobile device; and an eyepiece onto which the reflecting surface reflects the images.

17 Claims, 19 Drawing Sheets

(56) References Cited

U.S. PATENT DOCUMENTS

| | | | |
|---|---|---|---|
| 2009/0174946 A1 | 7/2009 | Raviv et al. | |
| 2010/0079356 A1* | 4/2010 | Hoellwarth | G02B 27/017 345/8 |
| 2011/0213664 A1 | 9/2011 | Osterhout et al. | |
| 2011/0221658 A1 | 9/2011 | Haddick et al. | |
| 2011/0241976 A1 | 10/2011 | Boger et al. | |
| 2012/0200592 A1 | 8/2012 | Kimura | |
| 2012/0235902 A1 | 9/2012 | Eisenhardt et al. | |
| 2012/0242560 A1 | 9/2012 | Nakada et al. | |
| 2012/0306940 A1 | 12/2012 | Machida et al. | |
| 2013/0127980 A1 | 5/2013 | Haddick et al. | |
| 2013/0241948 A1 | 9/2013 | Kimura | |
| 2013/0242253 A1 | 9/2013 | Blum et al. | |
| 2013/0250135 A1 | 9/2013 | Blum et al. | |
| 2013/0318776 A1 | 12/2013 | Jacobs et al. | |
| 2013/0321925 A1 | 12/2013 | Jacobs et al. | |
| 2013/0322683 A1 | 12/2013 | Jacobs | |
| 2013/0335573 A1 | 12/2013 | Forutanpour et al. | |

OTHER PUBLICATIONS

APPTOYZ—AppBlaster, (Nov. 7, 2012) http://www.apptoyz.com/blog/.

FOV2GO (May 19, 2012) San Mateo, CA., http://projects.ict.usc.edu/mxr/blog/fov2go-at-maker-faire-may-19-20/.

Project Glass (Nov. 2, 2012) Google+, https://plus.google.com/+projectGlass.

MY3D 360-Degree Handheld Viewer, (Mar. 31, 2011), http://www.hasbro.com/hasbromy3d/en_us/news.cfm.

Lazer Tag Toy, (Aug. 3, 2012) Hasbro, 11 pp.

App Blaster (Jan. 25, 2011) http://www.pocket-lint.com/news/38099/app-gun-apptoyz-remote-control, 8 pp.

App Blaster iPhone Gun (Review), (Sep. 27, 2011); http://www.phonesreview.co.uk/2011/09/27/app-blaster-iphone-gun-hands-on-review.

Handrahan, "Oculus Rift and the Virtual Reality Revolution" (Dec. 18, 2012) 6 pp.

Smart Glasses Technology (Jan. 7, 2012) Vuzix, Las Vegas, NV, 2 pp http://www.vuzix.com.

Nomad (Sep. 1, 2002) MicroVision, http://gizmodo.com/009716/microvision-nomad-heads-up-display, 2 pp.

Wrap 1200 (Aug. 12, 2011), Vuzix, 2 pp.

* cited by examiner

Typical Fresnel Lens Pattern

HEAD MOUNTED DISPLAY WITH REMOTE CONTROL

FIELD OF THE INVENTION

The present invention relates generally to head mounted displays, and particularly to a head mounted display that projects a stereoscopic image from an attached mobile electronics device onto an eyepiece, which gives the effect of a virtual image superimposed on the real world.

BACKGROUND

Three dimensional images (3D) are increasingly used to display vivid images in movies, electronic games and in other applications. For example 3D movies are displayed in theatres and are viewed by persons equipped with special 3D glasses. Additionally, 3D movies and electronic games may be displayed on specially equipped televisions or computer displays for viewing by persons equipped with special 3D glasses.

The basic approach to displaying 3D images is to display two slightly offset images separately to the left and right eye. The two principal strategies have been used to accomplish this are: (1) for the viewer to wear a special 3D eyepiece that filters each offset image to a different eye; and (2) to split the light source directionally into each of the viewer's eyes, thus eliminating the need for special glasses.

One increasingly common approach to projecting stereoscopic image pairs is a head mounted display system that mounts to a person's head and that displays a virtual image on an attached eyepiece. Head mounted displays are often used in simulators or for games, though they can also be used to view media such as movies or digital photos.

A portable or mobile electronics device, referred to hereinbelow as a mobile device, such as a smartphone, is capable of generating and displaying a stereoscopic or 3D movie or image that when projected onto an eyepiece appears to a viewer to have depth, i.e. three dimensions. This approach offers a low cost, mobile, solution to viewing 3D images since mobile electronics devices such as smartphones are widespread and relatively inexpensive. Therefore, it would be desirable to able to attach a mobile device to a head mounted display that properly displays 3D images or movies on an attached eyepiece.

Such a device could also be used to view traditional, 2D media, including images, photos and web content in the form of a virtual display in front of the viewer. This would be desirable because of the relative size and comfortable position of the virtual display as compared to a laptop or small screen device.

Prior art head mounted displays typically mount over a person's face in such a way that facial features are not visible. Thus, when a person is speaking to or looking at another person wearing a prior art head mounted display they are unable to see the person's face. The lack of visual cues provided by facial features makes such human interactions somewhat unnatural.

Therefore it would be advantageous if the front portion of a head mounted display would rest above the eyebrows leaving the face of the person wearing the device substantially unobstructed so that a person looking at someone wearing such a device could see his/her facial features.

Another disadvantage of prior art head mounted displays is that they support a fairly narrow range of interpupilary distances. Thus it would be advantageous to provide a head mounted display that accommodated a wide range of interpupilary distances.

SUMMARY OF THE INVENTION

The present invention discloses a head mounted display that includes a frame that fits around the head of a viewer, an optical assembly that secures a mobile device and projects a three dimensional (3D) image displayed by the mobile device onto an eyepiece that is also attached to the frame. The image displayed may also be flat, or two dimensional, if the image delivered to both eyes is identical. The 3D image may be moving or still. Further, the eyepiece may be partially transparent, which has the effect of superimposing the 3D image on the real world as seen through the eyepiece. Alternatively, the eyepiece may be opaque in which case the experience for the viewer is considered to be immersive.

In one embodiment, the head mounted display includes remote that a viewer wearing the head mounted display uses to activate functions on the mobile device. In one embodiment, the remote control has an LED or other means of illumination and can act as a marker to identify the position with a display area projected onto the eyepiece from the mobile device. In certain embodiments, the remote control includes sensors that provide data to the mobile device that can be used to compute the absolute position of the remote control. The remote control includes a number of controls including a joystick and one or more buttons or other controls. The remote control may be attached to the housing of the head mounted display or can be detached and held in the hand of the viewer.

In one embodiment, the subject invention is a head mounted display that displays three dimensional images from a mobile device, and includes a strap that secures the head mounted display to the head of a viewer, a viewing assembly connected to the strap, that includes a housing, a mobile device holder, connected to the housing, a reflecting surface, connected to the housing, that reflects images displayed by the mobile device; and an eyepiece, connected to the housing, onto which the reflecting surface reflects the images.

In yet another embodiment, the subject invention is a head mounted display device for displaying images from a mobile device that includes a housing that secures an inserted mobile device, which fits on the head of a human viewer, the mobile device comprising a forward-facing side with a display and a backward-facing side, a reflecting surface, connected to the housing, that reflects images displayed by the mobile device, a lens, connected to the housing, that focuses images reflected by the reflecting surface, an eyepiece, connected to the housing, onto which the images from the lens focus for display to the viewer, and a remote control that includes a plurality of controls operable by the viewer, and a wireless transceiver for communicating with the inserted mobile device.

BRIEF DESCRIPTION OF THE DRAWINGS

The present invention will be more fully understood and appreciated from the following detailed description, taken in conjunction with the drawings in which.

DETAILED DESCRIPTION

Figure 1A:
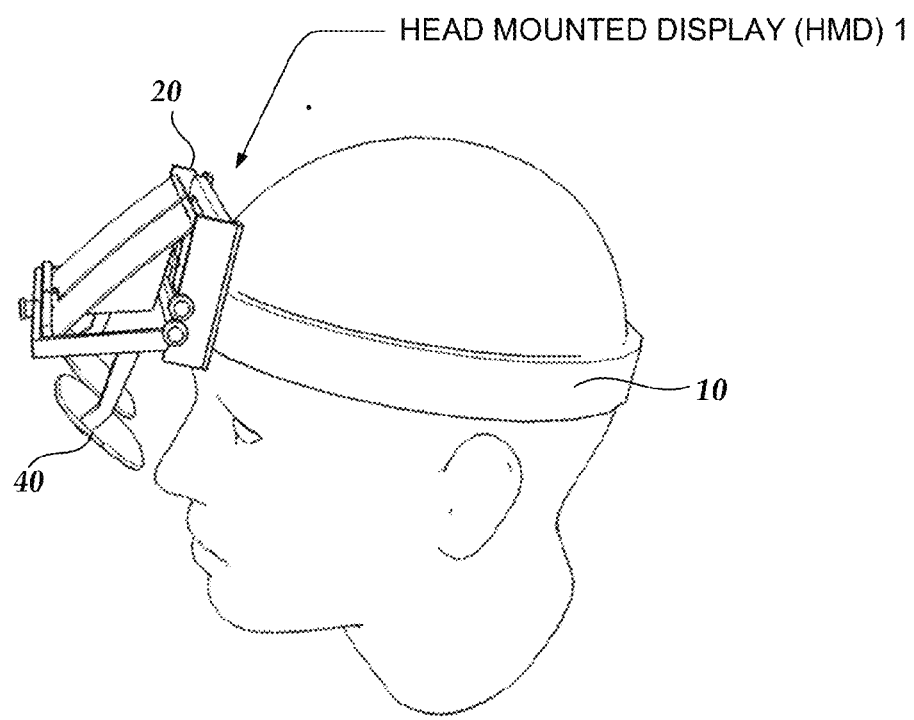
FIGS. 1A and 1B are simplified illustrations of a viewer wearing a head mounted display inside of which a mobile device is mounted.

The invention will be more completely understood through the following detailed description, which should be read in conjunction with the attached drawings. Detailed embodiments of the invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the invention in virtually any appropriately detailed embodiment.

As used herein the following terms have the meanings given below:

Three-dimensional (also referred to as 3D) image—means a digital image which when projected onto a display such as an eyepiece in the present invention or onto a television or movie screen gives an illusion of depth, i.e. the 3D image enhances the viewers depth perception. One approach to 3D imagery uses a technique referred to as stereoscopy or stereoscopics in which two images, each recorded from a slightly different perspective, are presented separately to the left and right eye of the viewer. These two-dimensional images are then combined by the viewer's brain to generate a single stereoscopic, or stereographic, image that gives the perception of depth.

Mobile device—as used herein refers to an intelligent portable device that runs computer programs and has an integrated display capable of displaying digital images. Typical examples include smartphones such as the IPHONE from Apple Computer and the GALAXY from the Samsung Electronics Co. Other examples include inter alia pad computers, portable computers, personal digital assistants and electronic game consoles. Although mobile device typically provide telephonic and/or Internet access, a mobile device as referred to herein does not necessarily provide such communications. Typically, a mobile device includes a processor, storage for programs and data, a telephonic and data communications, a wireless transceiver and possibly near field communications capability. The term mobile device, as used herein, may refer to a commercially available smartphone such as the IPHONE, or it may refer to a custom designed and manufactured device that is integrated with the subject invention.

Eyepiece—means a reflective surface, either planar or convex, placed near the eye that reflects light to and from the eye of person using the subject invention. An eyepiece is typically constructed of a transparent or partially transparent material such as glass or plastic although it may also be opaque. An eyepiece may consist of two elements, i.e. one for each eye or of a single element. If an image is projected onto an opaque eyepiece then the viewing experience is said to be immersive. In the context of the present invention, an eyepiece typically does not perform an optical transformation, as is done by lens for corrective glasses, which correct for vision defects. However, in some cases an eyepiece used in the present invention might be combined with an optical lens for optical correction or for other purposes.

Half-silvered—An eyepiece, mirror or other optical element may be half-silvered. A half-silvered mirror or element refers to a volume of glass or plastic with a transparently thin coating of metal, such as aluminum, or another substance that enables part of incident light to be transmitted and part to be reflected. It is understood that the coating will absorb part of the light. While the term half-silvered generally suggests that approximately 50% of light is transmitted and 50% is reflected, as used herein the term refers other ratios as well. The term full-silvered is used to refer to an eyepiece or other optical element that reflects substantially all incident light, typically at least 90%. Other methods may be used to achieve the same result, including refractive optics.

Optical assembly—as used herein refers to a number of optical elements placed in a fixed relationship between the eye of a viewer using the subject invention and a digital device such as a mobile phone, digital camera or other digital device that emits or captures images. An optical assembly may include mirrors, lenses, prisms, beam splitters and the like.

Figure 1B:
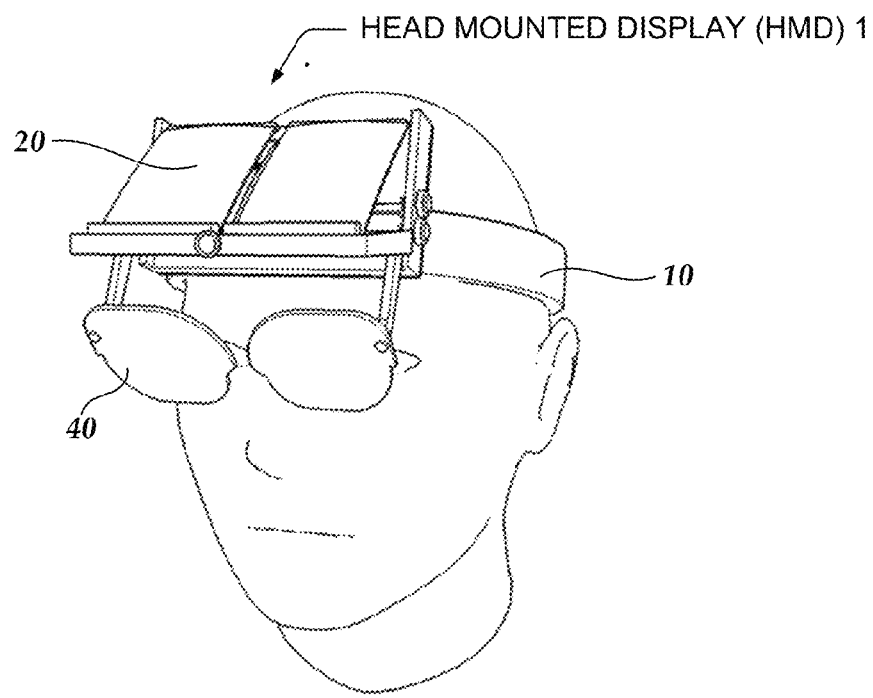

FIGS. 1A and 1B are simplified illustrations of a head mounted display 1 seen from the side and front perspectives respectively. HMD 1 comprises a strap 10 that binds or secures HMD 1 to a viewer's head, a viewing assembly 20, described in further detail below with reference to FIGS. 2A and 2B, that secures a mobile device and projects images from the mobile device onto an eyepiece 40.

Strap 10 must be both comfortable and sufficiently sturdy to prevent HMD 1 from slipping or tilting downwards or laterally. For example, plastic ratchet straps may be used. Most preferably, the strap is user adjustable.

In a preferred embodiment, eyepiece 40 consists, as indicated below in FIGS. 1A-B, of two separate elements that are attached to viewing assembly 20. In another embodiment, eyepiece 40 may take the form of a single element.

Figure 2A:
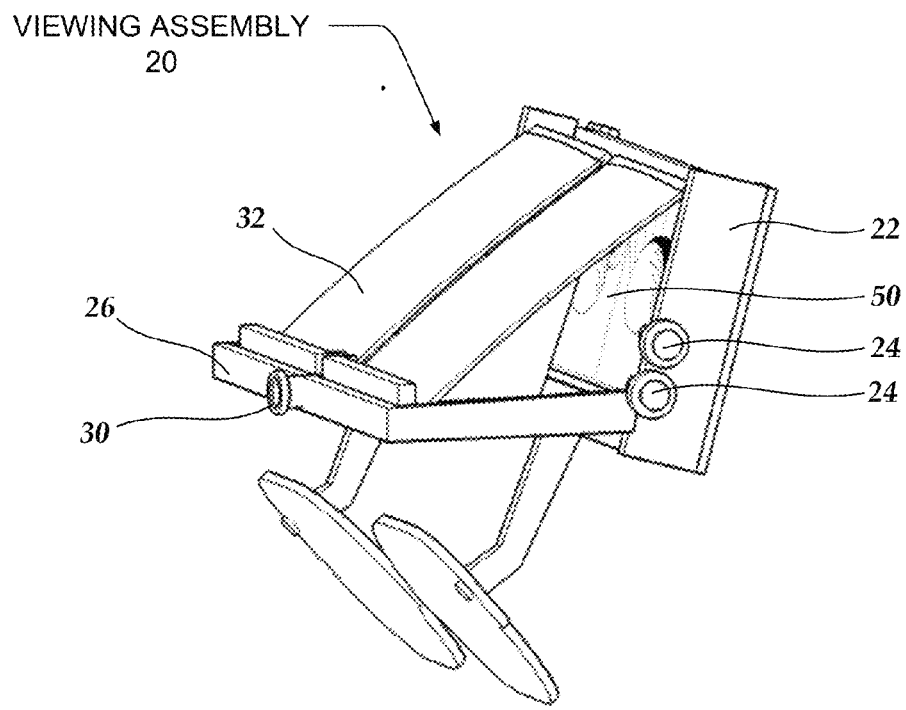
FIGS. 2A and 2B are isometric illustrations of a viewing assembly of a head mounted display.
Figure 2B:
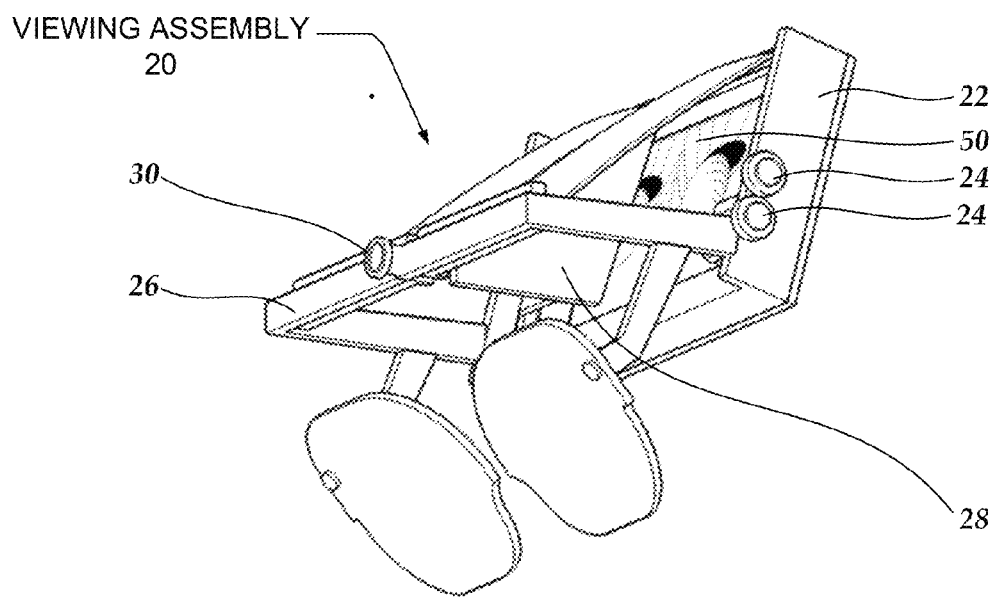

FIGS. 2A and 2B are isometric illustrations of viewing assembly 20 of head mounted display 1. FIG. 2A is an isometric illustration from a front right perspective and FIG. 2B is an isometric illustration from a top right perspective. Viewing assembly 20 includes a mobile device holder 22 that secures a mobile device 50, a reflecting surface 32, and a housing 26 that rigidly connects strap 10, mobile device holder 22, reflecting surface 32 and eyepiece 40. Viewing assembly 20 includes one or more mobile device controls 24 that can be activated by a viewer. Mobile device controls 24 enables a viewer to select functions from a user interface presented by mobile device 50. One embodiment of mobile device controls 24 is given hereinbelow with reference to FIGS. 4-6. In one embodiment, viewing assembly 20 also includes a camera 30. Camera 30 is a camera or video camera (camcorder) subsystem that provides digital video, digital still and/or digital sound input to mobile device 50. In one embodiment, a cable runs from camera 30 to mobile device 50 along housing 26. Camera 30 may be used inter alia to provide sensor inputs to mobile device 50 to enable mobile device 50 to perform image processing functions such as acial motion capture, or face recognition.

Mobile device holder 22 holds mobile device 50 securely such that mobile device 50 is prevented from slipping or falling out when the viewer moves his/her head. Mobile device holder 22 enables a viewer to easily insert and withdraw mobile device 50. For example, in one embodiment, mobile device 50 slides into a slot and snaps into place. Mobile device holder 22 is described in further detail hereinbelow with reference to FIGS. 4A-B.

Although not show in the figures, viewing assembly 20 and housing 26 may include suitably placed holes and clips for peripheral cables, such as speaker and microphone cables, to easily attach to mobile device 50.

Reflecting surface 32 comprises two spherical or parabolic surfaces, as depicted in FIG. 2A, such as mirrors, that are shaped and angled to reflect light emanating from mobile device 50 onto a respective side of eyepiece 40. In one embodiment, reflecting surface 32 is formed of two rectangular, convex mirrors, consisting of a right side mirror that reflects light from an image displayed on the right side of mobile device 50 onto a right side of eyepiece 40 and a left side mirror that reflects light from an image displayed on the left side of mobile device 50 onto the left side of eyepiece 40. The shape of reflecting surface 32 is optimized to display images that display on mobile device 50 onto eyepiece 40. Reflecting surface 24 may take on a variety of shapes including rectangular, and trapezoidal. Further, reflecting surface 32 may formed from a variety of materials including glass, plastic and metal.

In one embodiment, housing 26 includes an optical block 28 that blocks light from crossing from one side to another and prevents "crossover interference", which is when one eye sees the image intended for another eye. Optical block 28 is a nontransparent, typically dark, substance such as plastic that is placed between the two sides of reflecting surface 32.

In one embodiment, housing 26 is fabricated using an injection molded lightweight structure such as plastic or metal alloy. In one embodiment, housing 26 is a single continuous piece of material such as molded plastic. In another embodiment, one or more of the components of housing 26 are separate pieces that are securely attached or bonded together.

Figure 3A:
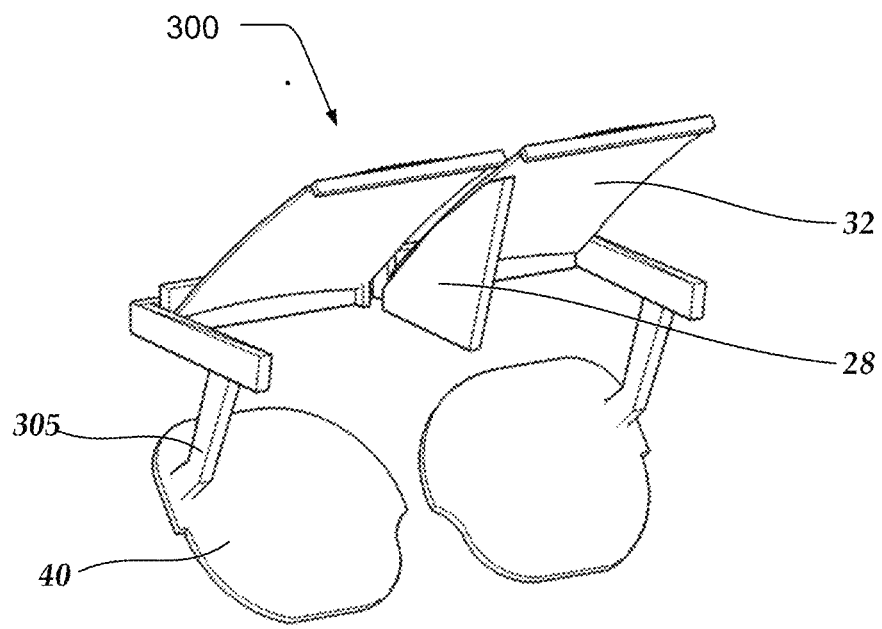
FIGS. 3A and 3B are isometric illustrations of a viewing assembly without a mobile device holder.
Figure 3B:
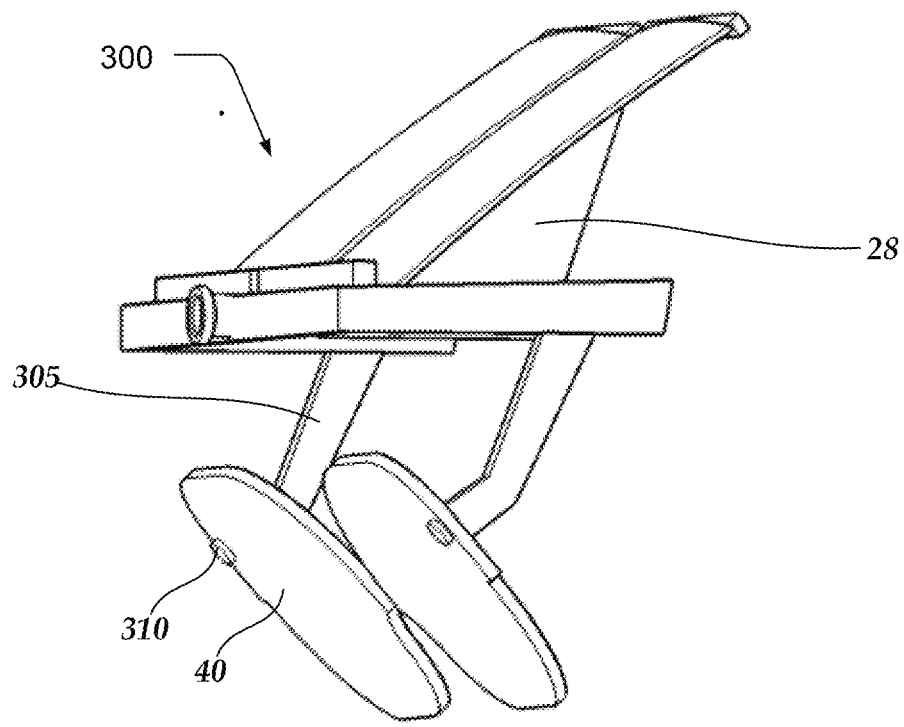

FIGS. 3A and 3B are isometric illustrations of viewing assembly 20 without mobile device holder 22. FIG. 3A is an isometric illustration from a rear perspective and FIG. 2B is an isometric illustration from a right side perspective. FIGS. 3A and 3B illustrate the role of optical block 28 in acting as an optical shield to prevent light from crossing from the right to the left or the left to the right sides as it travels from mobile device 50 (not depicted in this illustration) to reflecting surface 32 and then onto eyepiece 40.

In both FIGS. 3A and 3B, housing 26 includes a downward extension, referred to as arm 305, to which eyepiece 40 attaches. In one embodiment, illustrated in FIG. 3B, eyepiece 40 is secured to arm 305 by pressing it over an end-cap 310 portion of arm 305. In one embodiment, arm 305 swivels or travels up and down, similar to enable a view to move eyepiece 40 out of their field of vision.

Figure 4A:
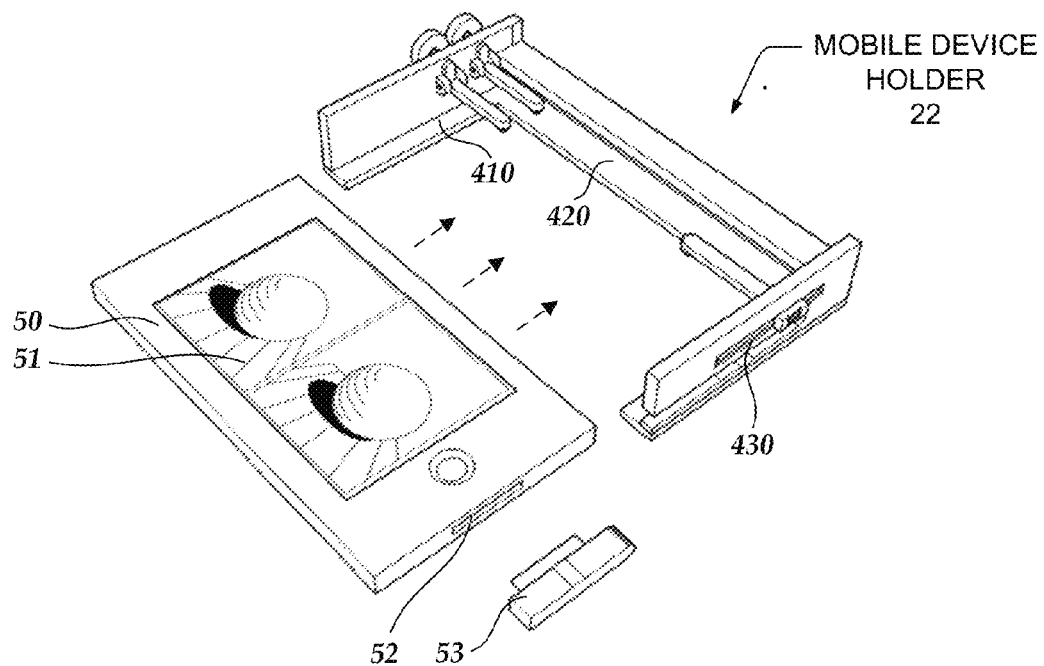
FIGS. 4A and 4B are illustrations of a mobile device holder of a viewing assembly for a head mounted display.
Figure 4B:
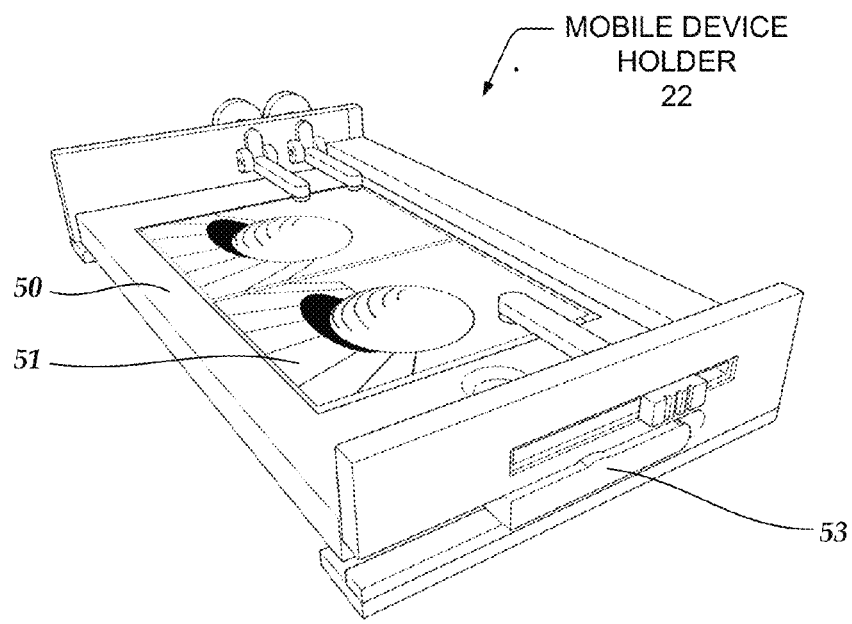

FIGS. 4A and 4B illustrate mobile device holder 22 and how it secures mobile device 50. In FIG. 4A mobile device 50 is shown to the left of mobile device holder 22. In FIGS. 4A-B two slightly offset images are shown on display 51; when correctly viewed, the two images are interpreted by the viewer as forming a single stereoscopic 3D image. To insert mobile device 50 into mobile device holder 22, a viewer slides mobile device 50 to the right, on top of guide 410 until it reaches a rear slot 420. In one embodiment, a port extender 53 may be placed through opening 430 of mobile device holder 22 and into a mobile device connector slot 52. Note that the term "dock connector" is also used to refer to the same function or device as port extender. In another embodiment, port extender 53 may be fitted first into connector slot 52 and then a viewer slides mobile device 50 along guide 410 until it reaches rear slot 420. In yet another embodiment, mobile device 50 may slide through the side of mobile device holder 22 and into place. Further, another type of device or connector, such as a USB connector may be connected to connector slot 52 at a given time rather than port extender 53, enabling mobile device 50 to be recharged or to communicate with a computer or other electronics device.

Port extender 53 is an element that extends, or elongates, the communications and power connection provided by mobile device connector slot 52. In one embodiment it protrudes through HMD 1 enabling a viewer to connect mobile device 50 to other electronics devices such as an external battery. Port extender 53 makes a passive, i.e. unpowered, electrical connection with mobile device 50 via mobile device connector slot 52.

Figure 5A:
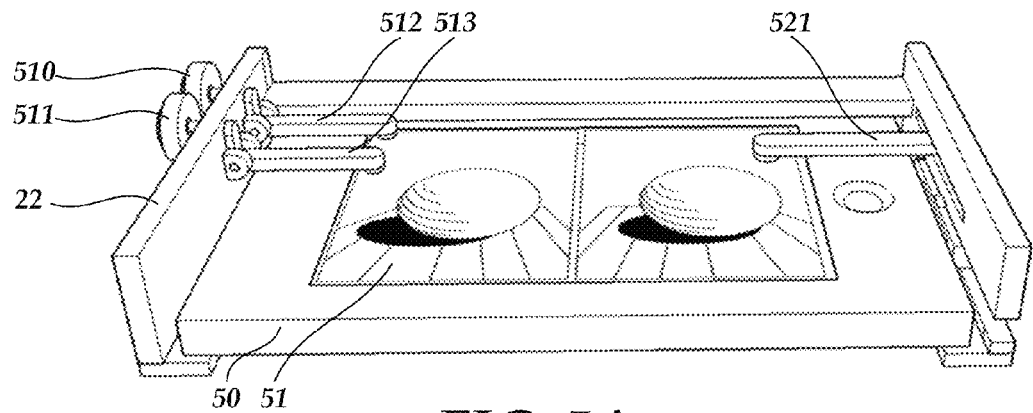
FIGS. 5A, 5B and 5C are illustrations of a preferred embodiment of mobile device controls for a head mounted display that includes a mobile device.
Figure 5B:
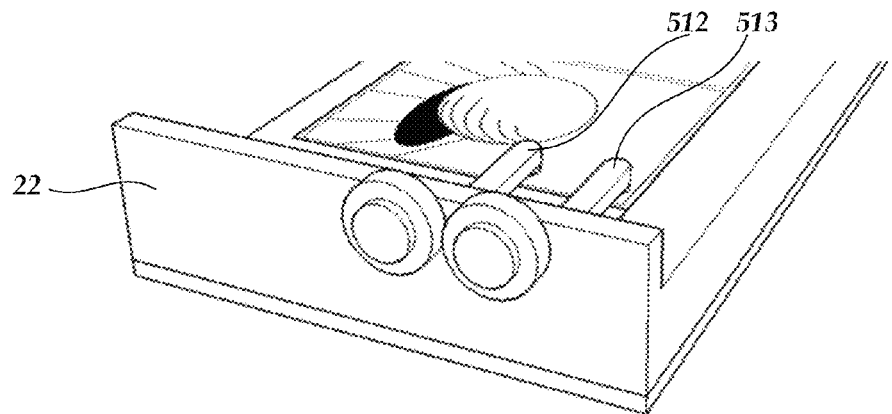
Figure 5C:
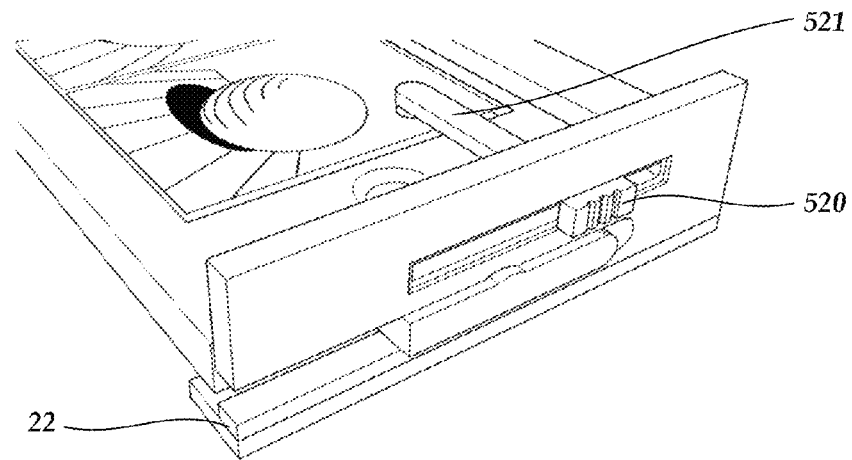

FIGS. 5A-C illustrate a preferred embodiment of mobile device controls 24. FIG. 5A provides a front isometric view of mobile device holder 22 into which mobile device 50 is inserted. FIG. 5B provides a left isometric view of mobile device holder 22. And, FIG. 5C provides a right isometric view of mobile device holder 22. In this embodiment, controls 24 includes two pushbuttons 510-511 on the left side of mobile device holder 22 and one slider 520, depicted in FIG. 5C only, on the right side of mobile device holder 22. It may be appreciated by one skilled in the art that pushbuttons 510-511 and slider 520 are embodiments of mechanical controls manually activated by a viewer to select functions from a user interface presented by mobile device 50. In this embodiment, controls 24 are specially adapted for a touch-sensitive display where contacting the surface of the display selects a function from a user interface presented by mobile device 50. Examples of such touch-sensitive displays include the IPHONE from APPLE COMPUTER, and the GALAXY from SAMSUNG ELECTRONICS. In other embodiments, controls 24 are adapted to activate physical buttons or other controls on a mobile device. In yet other embodiments, controls 24 are adapted to interface to a heat-sensitive display or to a proximity-sensitive display.

Pushbuttons 510-511 are connected to rocker arms 512-513 respectively. When one of pushbuttons 510-511 is pressed by a viewer its corresponding rocker arm swings downward and a special tip at the end of the rocker arm makes contact with a fixed location on display 51 of mobile device 50.

A viewer can slide slider 520 upwards or downwards; this has the effect of moving slider arm 521 upwards or downwards relative to the side of mobile device 50.

Figure 6A:
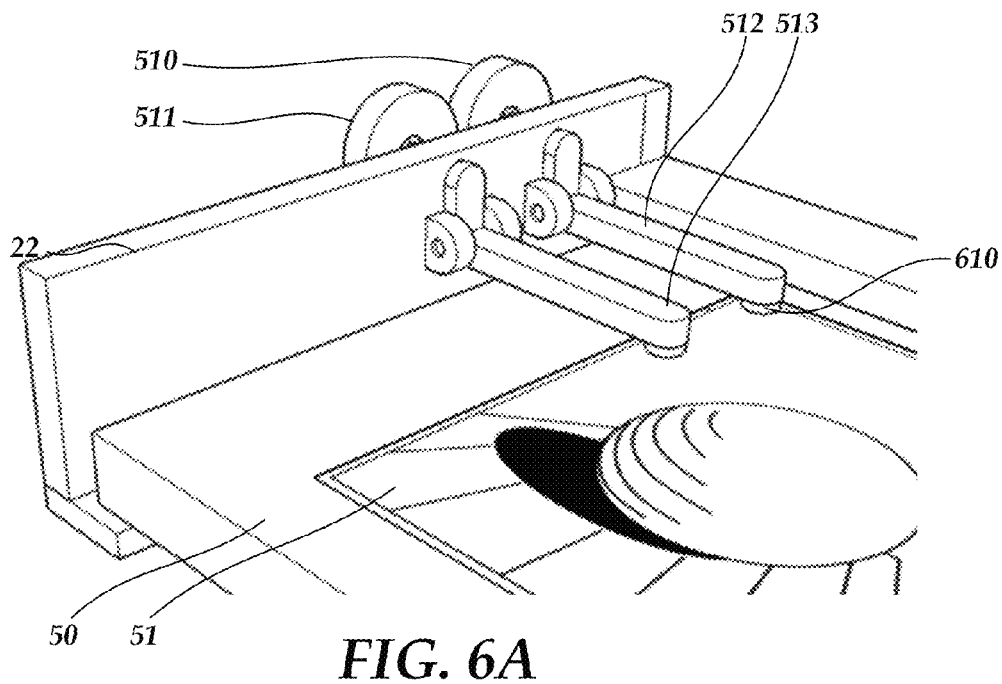
FIGS. 6A and 6B are close-up illustrations of a preferred embodiment of mobile device controls that are used by a viewer using a head mounted display to active functions of a mobile device.
Figure 6B:
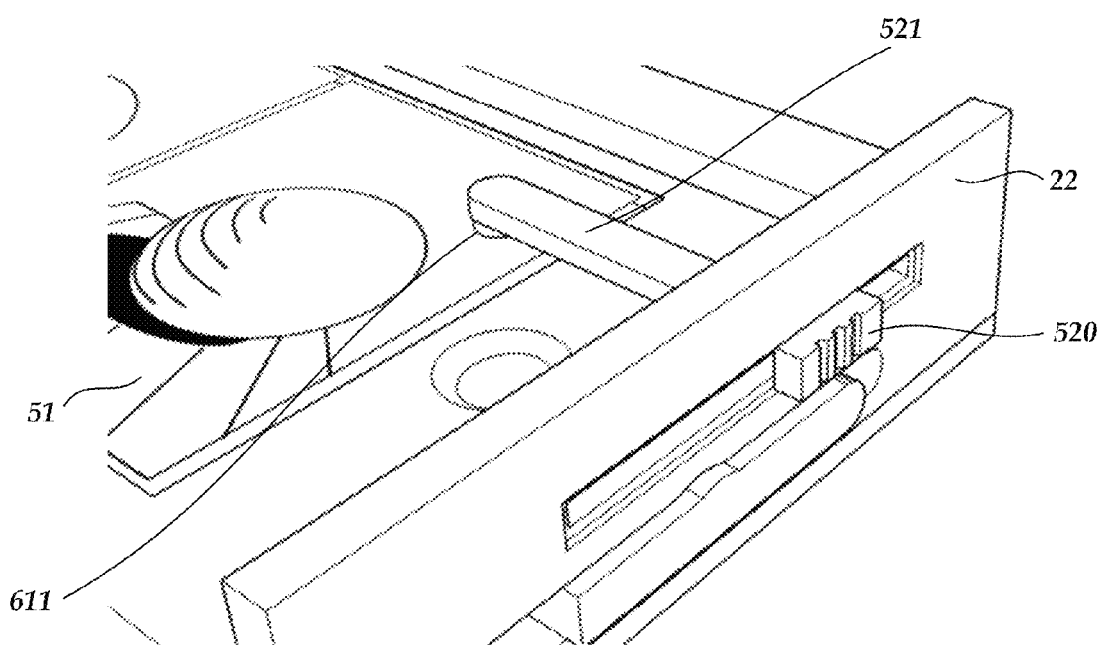

FIGS. 6A and 6B are close-up illustrations of a preferred embodiment of mobile device controls 24 that are used by a viewer using head mounted display 1 to activate functions of mobile device 50. It may be appreciated by one skilled in the art that in other embodiments there may be different mechanical controls or fewer or more of the mechanical controls illustrated in FIGS. 6A-B.

In FIGS. 6A-B, mobile device 50 is secured by mobile device holder 22. With reference to FIG. 6A, when one of pushbuttons 510-511 is pressed by a viewer its corresponding rocker arm 512-513 swings downward and a special tip 610 at the end of the rocker arm makes contact with a fixed location on display 51 of mobile device 50. Rocker arms 512-513 include mechanical linkages that protrude through mobile device holder 22 and attach to and secure pushbuttons 510-511.

With reference to FIG. 6B, a viewer slides slider 520 up or down, to position a slider arm 521 parallel to the side of mobile device 50. In one embodiment, unlike pushbuttons 510-511 slider arm 521 does not include a rocker arm mechanism. Rather, a tip 611 of slider arm 521 is always in contact with display 51. Thus, tip 611 remains in contact with and slides up and down on display 51, parallel to the side of mobile device 50. In one embodiment, slider 520 is made of a single piece of plastic. In this embodiment, slider 520, i.e. the part that makes contact with a viewer's thumb, and slider arm 521 are part of a single piece of molded plastic. In one embodiment, tips 610 and 611 are made of a material that is adapted to the particular touch sensing technology used by mobile device 50.

Mobile device controls 24 can be adapted to work with a variety of mobile device screens, including inter alia capacitive screens, pressure sensitive screens, mufti-touch and gesture-based screens. For example, in the case of a capacitive screen, which is a type of touch sensitive screen that employs capacitive touch sensors to detect viewer interactions, tips 610 and 611 are made of an electrically conductive material that increases or changes the relative capacitance, or parasitic capacitance to ground, when contact is made with the capacitive sensors of the display. In some embodiments, tips 610-611 include a contact surface made, at least in part, of a conductive fabric. Such a conductive fabric may increase flexibility of the tip to enlarge the point of contact with the display and thereby enhance electrical coupling at the point of contact. In some embodiments the tip may be made of a flexible material such as plastic embedded with conductive material such as metallic wires or grains.

Controls 24 are specially designed to work with a variety of computer programs, including 3D display programs, 3D games and movie players, that runs on mobile device 50. Such computer programs include a user interface that can be operated using controls 24. For example, in one embodiment, pushbuttons 510-511 each enable the viewer to select a single function while slider 520 enables the viewer to activate a number of functions by selecting an item from a menu that is arranged along the side of display 51. One embodiment of a menu is described with reference to FIG. 7 hereinbelow. A computer program that works with controls 24 may be a specially designed program that works in conjunction with head mounted display 1 or it may be a commercially available program that operates on a mobile device. There are several commercially available 3D display programs available for mobile devices such the IPHONE including MY3D from Hasbro Inc.

Figure 7:
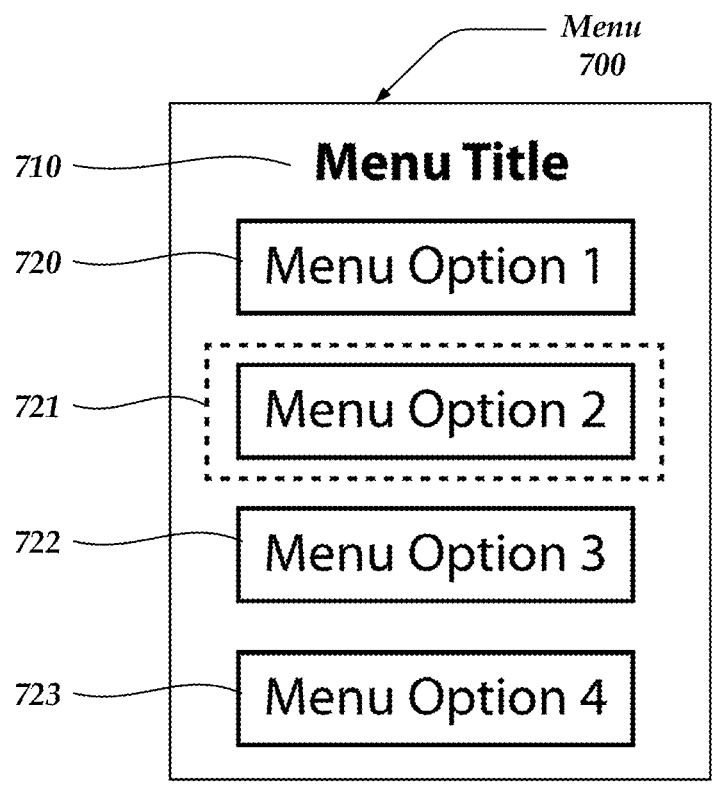
FIG. 7 illustrates one embodiment of a menu that appears on a mobile device display, and consequently is projected onto an eyepiece, in response to a viewer using a mobile device control on a head mounted display.

FIG. 7 illustrates one embodiment of a menu 700 that appears on mobile device display 51, and consequently is projected onto eyepiece 40, in response to a viewer using mobile device controls 24 on head mounted display 1. In this embodiment, a viewer uses mobile device controls 24 to select a menu item from menu 700, thereby causing mobile device 50 to activate a corresponding function. Menu 700 includes a menu title 710 and four menu options 720-723. In this example, menu option 721 is highlighted.

In one embodiment mobile device controls 24 include a back button, corresponding to one of pushbutton 510-511, an enter button corresponding to the other of pushbutton 510-511 and an up-down slider, corresponding to slider 520. In this embodiment, a viewer first pushes enter button to signal to mobile device 50 that it should present menu 700. Consequently, mobile device 50 displays a menu such as menu 700 that provides one or more menu options 720-723. Next, the viewer uses the up-down slider to select one of menu options 720-723 and then activates the selected menu option using the enter button.

Figure 8:
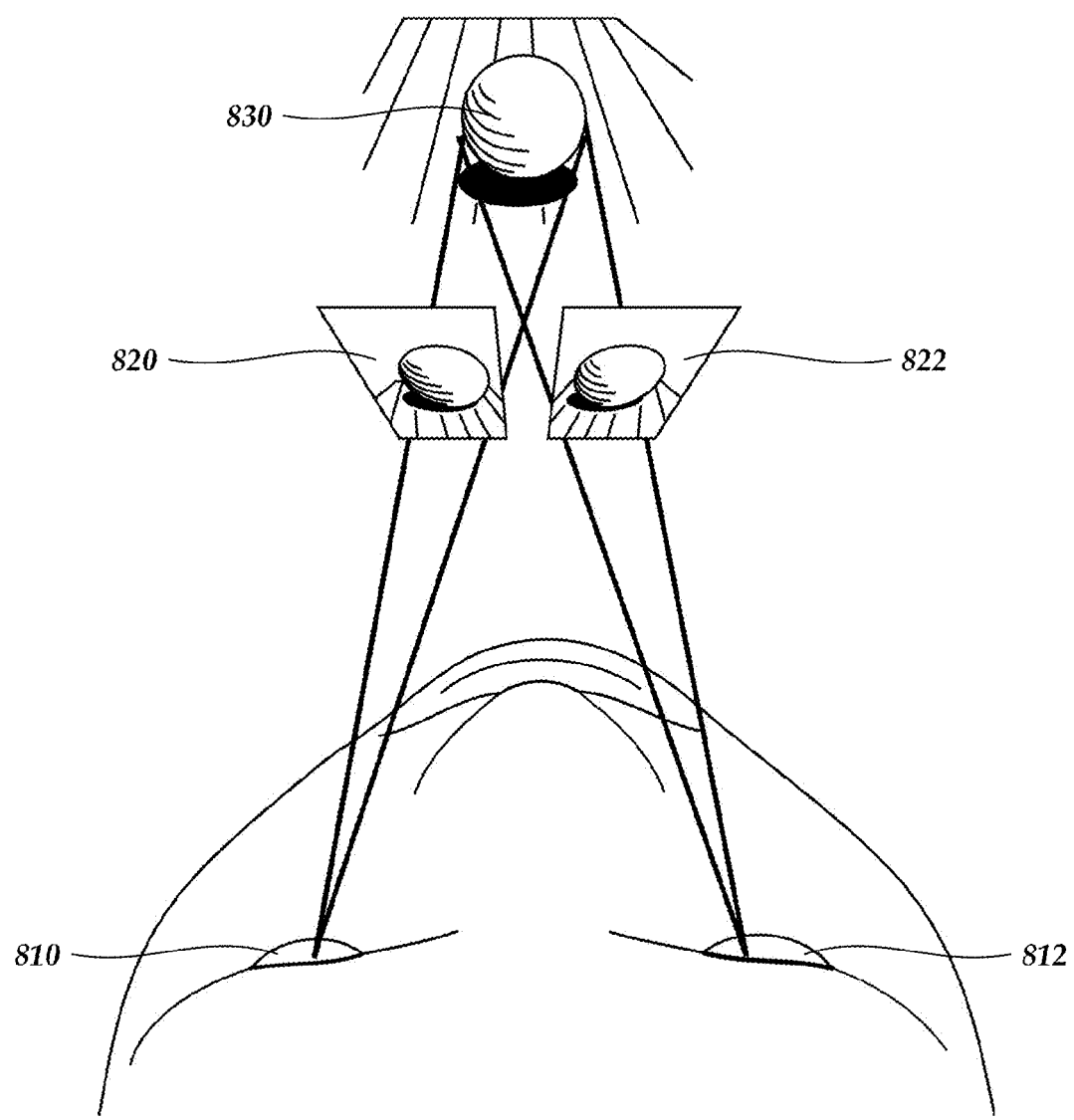
FIG. 8 is an illustration of the principle of stereoscopic imagery.

FIG. 8 is an illustration of the principle of stereoscopic imagery. In the illustration, a viewer's left eye 810 looks at one image that is displayed or projected onto a left surface 820. Similarly, a viewer's right eye 812 looks at a different, slightly offset, image that is displayed or projected onto a right surface 822. The viewer's mind combines the two images, thus giving the viewer the perception of a single, combined, stereoscopic image 830, that appears in the center. The focal length, i.e. the distance at which the stereoscopic image appears to the viewer is further than the distance to the left and right surfaces, as indicated by the distance to the 3D ball depicted in stereoscopic image 830.

A stereoscopic or 3D computer program that runs on mobile device 50 uses this principle to achieve an illusion of depth by projecting two slightly offset images, that display side-by-side on a mobile device, separately to the left and right eye of the viewer, i.e. one image is projected onto a portion of eyepiece 40 that is exclusively viewed by the left eye and the other image is projected onto a portion of eyepiece 40 that is exclusively viewed by the right eye. These two-dimensional images are then combined by the viewer's brain to give the perception of 3D depth.

It may be appreciated by one skilled in the art, that two identical images can be projected onto left surface 820 and onto right surface 822. In this case, the mind combines the two images properly, as in stereoscopy, but the resulting picture lacks in depth; i.e. the viewer sees a 2 dimensional image rather than a 3 dimensional image. Thus, HMD 1 can be used for viewing non-stereoscopic 2D images as well.

Figure 9:
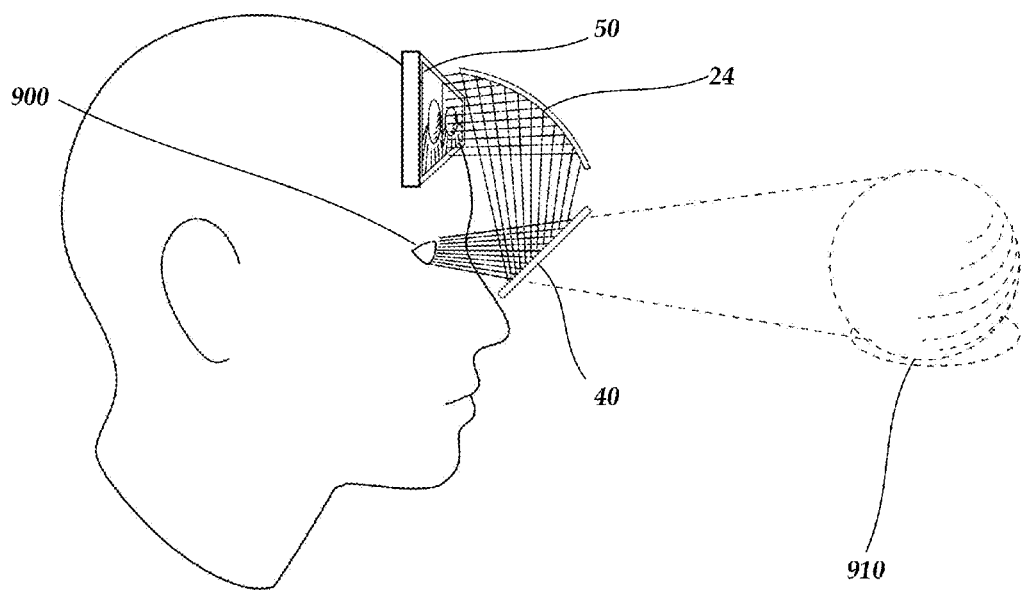
FIG. 9 illustrates the projection path of a three dimensional image from a mobile device to a reflecting surface onto an eyepiece.

FIG. 9 illustrates the projection path of a three dimensional image from mobile device 50 to reflecting surface 32 onto eyepiece 40. Mobile device mobile device 50 displays an image, which is reflected by reflecting surface 32 onto eyepiece 40. Concurrently, a viewer, using their eyes 900 looks at eyepiece 40 which is either opaque or partially transparent and sees the reflected image.

If eyepiece 40 is partially transparent, then the world appears through eyepiece 40 and the image, represented in FIG. 9 as three dimensional object 910, appears, centrally positioned, and superimposed over the world.

Embodiments of a Head Mounted Display with Remote Control

Figure 10:
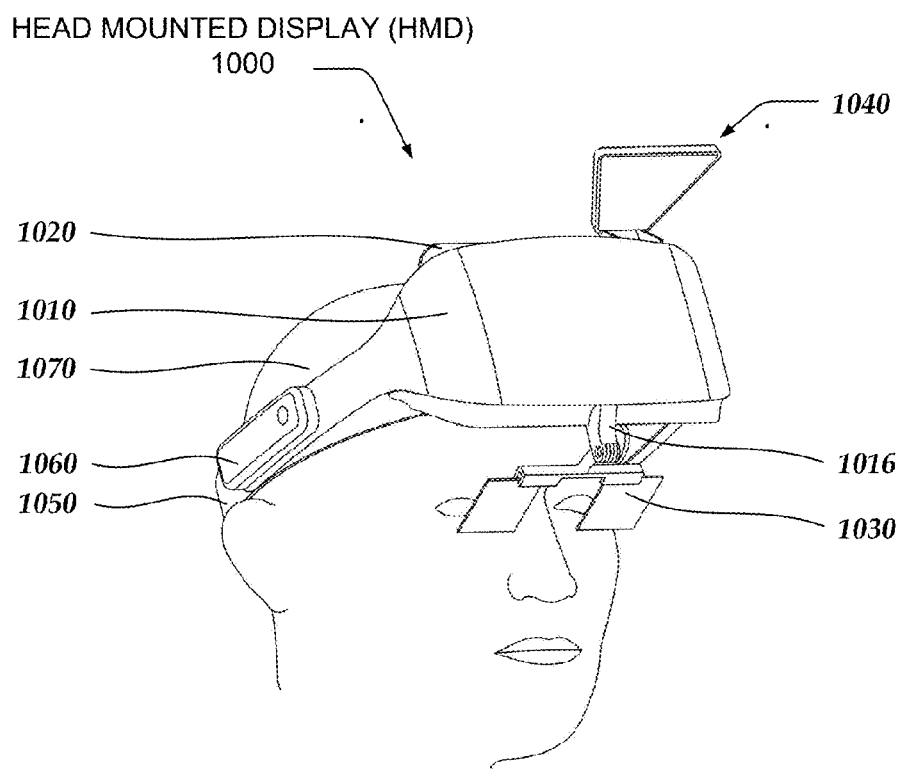
FIG. 10 illustrates an embodiment of a head mounted display (HMD) that includes an optical assembly and a mobile device remote control, referred to simply as a remote control.

FIG. 10 illustrates an embodiment of a head mounted display (HMD) 1000 that includes an optical assembly and a mobile device remote control, referred to simply as a remote control. FIGS. 11-18 disclose embodiments of HMD 1000 that may include a lens, prism or other optical element, which is not present in the embodiments described with reference to FIGS. 1-9.

HMD 1000 includes a housing 1010, which secures a mobile device 1020, and which also secures an optical assembly (not shown in FIG. 10), allowing it to be positioned on the forehead, substantially above the eyebrows, so as not to obscure the eye or face of a viewer 1070 that is wearing HMD 1000. This enables the viewer to interact in a natural way with other persons while wearing and using HMD 1000, i.e. without HMD 1000 obscuring or partially obscuring their face. In certain embodiments, housing 1010 is secured to the head of viewer 1070 using a strap 1050. The optical assembly reflects images from a display of mobile device 1020 onto an eyepiece 1030 for viewing by viewer 1070. In one embodiment, eyepiece 1030 is connected by an eyepiece holder 1016 to housing 1010; in other embodiments, eyepiece 1030 may be connected by a frame to the ears of viewer 1070 or may be otherwise secured to the head of viewer 1070. Thus, in general, housing 1010 does not include eyepiece holder 1016, although in certain embodiments, and, for example, as depicted in FIG. 10, eyepiece holder 1016 connects to housing 1010.

A key aspect of HMD 1000 is that the optical assembly works with large displays, such as the displays of popular smart phones such as an APPLE IPHONE 4, 4S, 5, and 5S from APPLE COMPUTER INC. For example, HMD 1000 is designed to work with the IPHONE 5 which has 5 inch diagonal display and 16×9 aspect ratio. This requires, for example, in embodiments of HMD 1000 that include a primary reflecting surface or mirror, such as that described with reference to FIGS. 11A-C hereinbelow, the primary reflecting surface be large enough to reflect the requisite amount of light from the IPHONE 5 display into the primary optical element to avoid deterioration of the IPHONE 5 screen image.

In certain embodiments, HMD 1000 includes a mobile device remote control, 1060, that can be detached from HMD 1000 and operated by hand. Remote control 1160 enables viewer 1070 user to wirelessly control applications running on mobile device 1020.

HMD 1000 comprises a variety of optical elements and configurations which have the characteristic of enabling a mobile device and housing 1010 to rest substantially above the forehead. Embodiments of HMD 1000 include HMD 1100, described hereinbelow, as well as HMD 1700 and 1800. Other embodiments and configurations are also within the scope of HMD 1000.

Figure 11A:
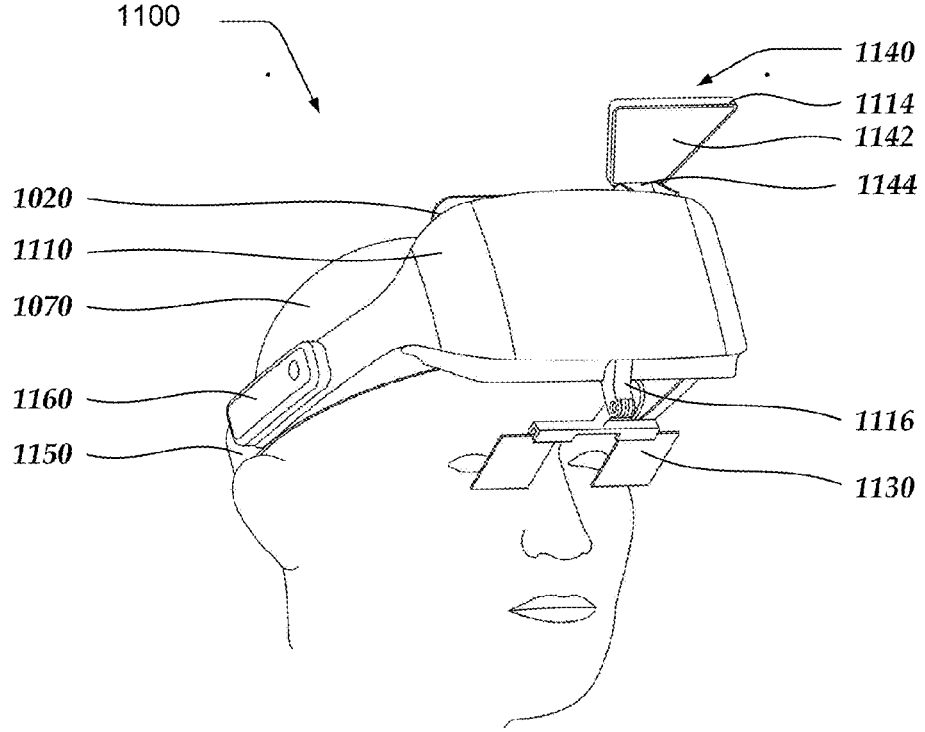
FIGS. 11A-C are illustrations of an embodiment of the head mounted display illustrated in FIG. 10 that includes two reflective surfaces and a lens.
Figure 11B:
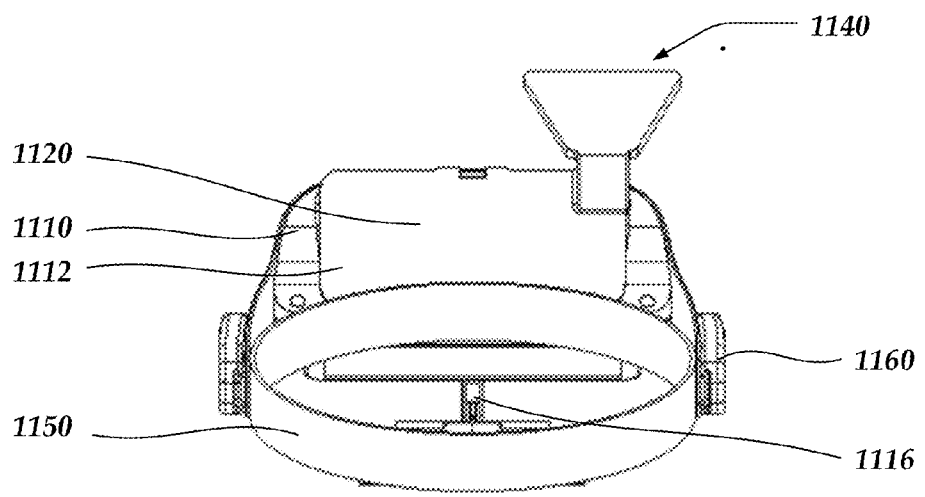
Figure 11C:
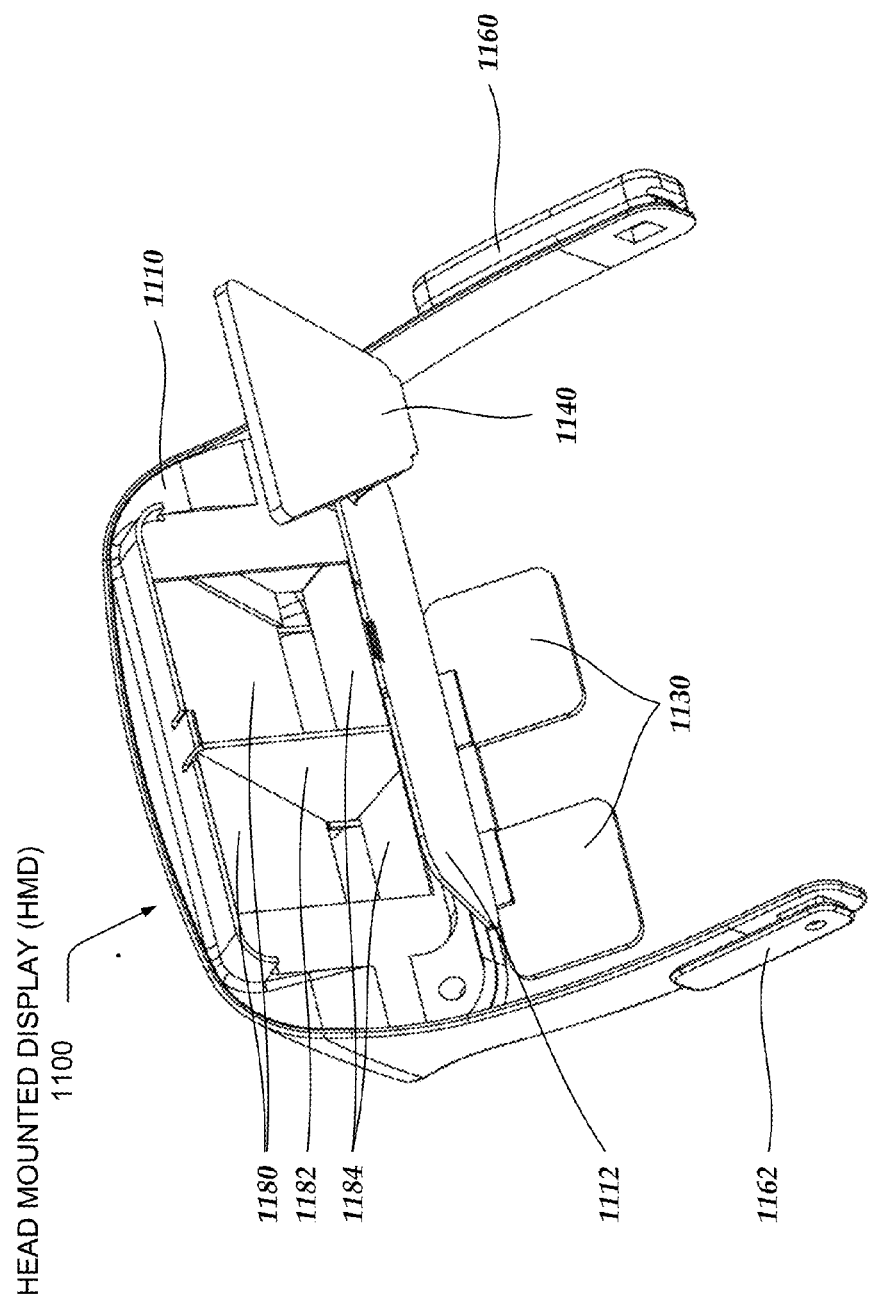

FIGS. 11A-C are illustrations of an embodiment, referred to as HMD 1100, of head mounted display (HMD) 1000 that includes two reflective surfaces and a lens.

HMD 1100 includes a housing 1110 that secures or connects a plurality of optical elements, referred to as an optical assembly, including an eyepiece 1130, a periscope 1140, and a reflecting surface described with reference to FIG. 11C hereinbelow. A strap 1150 connects to housing 1110 and binds or secures HMD 1100 to the head of a human user or viewer 1070. HMD 1100 further includes a mobile device remote control 1160 (henceforth referred to as simply remote control 1160), described in further detail with reference to FIG. 15.

FIG. 11A shows the front of housing 1110, while a back cover 1112 of housing 1110 is shown in FIG. 11B. A mobile device 1020 is secured by the housing inside back cover 1112; note that mobile device 1020 cannot be seen in FIG. 11A as it is beneath back cover 1112. Mobile device 1120 is depicted in reference to the various parts of housing 1110 in FIG. 12. The purpose of HMD 1100 then is to secure mobile device 1020 and to enable images displayed on mobile device 1020 to appear on eyepiece 1120 for viewing by viewer 1070. While HMD 1100 illustrates an embodiment of a head mounted display that is designed to work with specific mobile devices such as an APPLE IPHONE 4, 4S, 5, and 5S from APPLE COMPUTER INC., other embodiments of HMD 1000 and HMD 1100 may function with other makes and models of mobile devices without departing from the scope and spirit of the subject invention.

Strap 1150 is both comfortable and sufficiently sturdy to prevent HMD 1100 from slipping or tilting downwards or laterally. For example, plastic ratchet straps may be used. Preferably, the strap is may be adjusted by the viewer to tighten or loosen HMD 1100 relative to the head of viewer 1070.

In certain embodiments, housing 1110 includes a camera (not depicted) that can take still pictures, video clips, and/or record sound. In one embodiment, a cable runs from the camera to mobile device 1020 along or inside of housing 1110. The camera may be used inter alia to provide sensor inputs to mobile device 1020 to enable mobile device 1020 to record videos, photos and sound and to perform image processing functions such as facial motion capture, or face recognition.

In one embodiment, one or more of the components that attached to housing 1110 are separate pieces that may be detached. Specifically, an eyepiece holder 1116 that secures eyepiece 1130 and periscope 1140 may be independently removed. This feature may be useful for packing HMD 1100; further, periscope 1140 is only necessary for forward-looking applications and is not needed when a viewer watching a movie that is being displayed on eyepiece 1130 so it can be removed in such a case without impairing the usefulness of HMD 1100 for such uses. In one embodiment, housing 1110 is fabricated using an injection molded lightweight structure such as plastic or metal alloy. In other embodiments, housing 1110 is a single continuous piece of material such as molded plastic and includes eyepiece holder 1116 and periscope 1140, in which case these components may be not detachable.

Typically, eyepiece 1130 is half-silvered, i.e. coated in such as way as to be partially transmissive and partially reflective. Generally, eyepiece 1130 may be coated such as to produce any desired level of transmission, reflectivity or opacity. Further, in certain embodiments, eyepiece 1130 is equipped with a curtain that entirely blocks incoming light and renders it entirely opaque. This results in a fully immersive experience for the viewer and may be desirable when playing games or when watching movies. The curtain may be constructed of any opaque material including opaque plastic and fabric. The curtain may be attached in a variety of ways to eyepiece 1130 including using hooks or VELCRO or other adhesive tape.

As an alternative to or in addition to coating, eyepiece 1130 may be made of an electro-active material with the optical properties that may be electrically controlled. For example, transmission of light may be controlled to produce varying percentages of transmission. Liquid crystal is one example of an electro-active material.

In certain embodiments, such as HMD 1100, eyepiece 1130 is implemented as a left and a right eyepiece. In other embodiments, eyepiece 1130 is implemented as a single element. In one embodiment, eyepiece 1130 is detachable from eyepiece holder 1016 allowing a viewer, for example, to substitute prescription glasses, sunglasses, and glasses with different levels of opacity. For example, eyepiece 1130 may be more suitable for watching movies if it is substantially opaque, while it may be more suitable for outdoor activities if it is in the range of 30% to 70% opaque.

Although not depicted in the figures, housing 1110 may include suitably placed holes and clips for peripheral cables, such as speaker and microphone cables, to easily attach to mobile device 1020.

In certain embodiments HMD 1100 does not include mobile device 1020; rather a viewer inserts his/her own mobile device into HMD 1100.

Periscope 1140, an embodiment of periscope 1040, includes a periscope housing 1114 that is a part of housing 1110, and two mirrors: a smaller, lower mirror 1144 and a larger, upper mirror 1142. Lower mirror 1144 is placed in the line of sight of a rear facing camera lens of mobile device 1120. Lower mirror 1144 reflects light from upper mirror 1144 directly into the rear facing lens of mobile device 1020. Upper mirror 1142 reflects light from the front of viewer 1070 towards lower mirror 1144 and thus into the rear facing lens of mobile device 1020. Generally, this enables mobile device 1020 to receive a forward looking reflected image that can be used for display or analysis. For example, periscope 1140 may assist mobile device 1020 to capture an image that is then analyzed to determine where viewer 1070 is looking.

In certain embodiments, periscope 1140 is detachable. This is useful, for example, when watching a movie, in which case a periscope may not serve a purpose and might be cumbersome when reclining on a pillow.

FIG. 11C is an isometric illustration from the above rear of head mounted display (HMD) 1100. In FIG. 11C, back cover 1112, to which periscope 1140 attaches, is open, i.e. hinged outwards. As no mobile phone is inserted in housing 1110, in FIG. 11, the optical elements of HMD 1100 are revealed. They include a primary reflecting surface 1180, a lens 1184, and eyepiece 1130. These optical elements are connected and secured by housing 1110.

In a preferred embodiment, reflecting surface 1180 includes a single reflecting surface, such as a mirror, that reflects light emanating from mobile device 1020 downward through lens 1184 onto a respective side of eyepiece 1130. Generally, reflecting surface 1180 performs a similar function to reflecting surface 32 of FIG. 2A. and is large enough to reflect the necessary light from the screen onto either an optical element or eyepiece.

As depicted, lens 1184 has two separate elements, a right lens and a left lens (right and left as seen by the viewer). In certain embodiments, the right and left lenses are Fresnel lenses and may include either or both cylindrical or Plano-convex forms to enable either a one-to-one mapping of aspect ratio or an anamorphic transformation of the image. In certain embodiments, lens 1184 may also be Plano-convex aspherical.

In certain embodiments, eyepiece 1130 is made of two separate elements, i.e. a right eyepiece and a left eyepiece (right and left referring, this case, to the perspective of the viewer). In other embodiments, eyepiece 1130 may take the form of a single element.

In certain embodiments, housing 1110 includes an optical block 1182 that blocks light from crossing from one side to another and prevents "crossover interference", which is when one eye sees the image intended for another eye. Optical block 1182 is a nontransparent, typically dark, substance such as plastic that is placed between the two sides of reflecting surface 1182.

Remote control 1160 may be mounted using a remote control mounting bracket 1162 on either side of housing 1110. In FIG. 11C, remote control 1160 is mounted on the right side; thus the mounting bracket 1162 on the right side of HMD 1110 is not visible; however, mounting bracket 1162 is visible on the left side since remote control 1160 is not mounted there.

Figure 12:
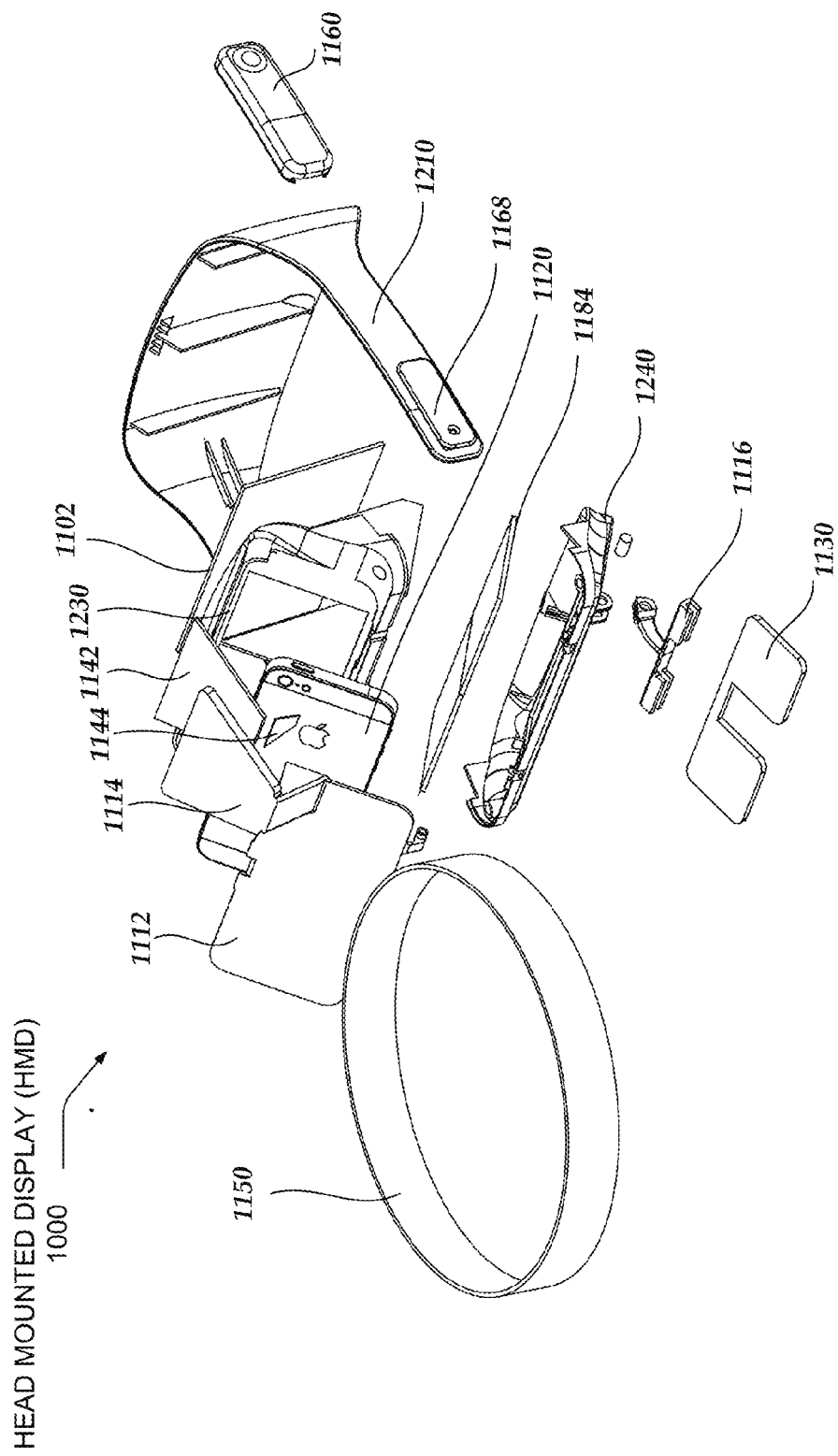
FIG. 12 is an exploded view of the head mounted display of FIGS. 11A-C.

FIG. 12 is an exploded view of HMD 1100 from a rear perspective. It illustrates the front-to-back relationship of each of the elements of HMD 1100, namely a front housing 1210, reflecting surface 1180, a top housing 1230, upper mirror 1142, lower mirror 1144, periscope housing 1114, back cover 1112, strap 1150, remote control 1160, mounting bracket 1168, mobile device 1120, lens 1106, a bottom housing 1240, a eyepiece holder 1116 and eyepiece 1130. In this embodiment, several separate parts interconnect to form housing 1110, namely front housing 1210, top housing 1230, back case 1112, and bottom housing 1112. While each of these parts are depicted as separate elements in FIG. 12, in other embodiments one or more of the parts may be combined or eliminated, and additional parts may be included, without departing from the scope and spirit of the subject invention.

Figure 13:
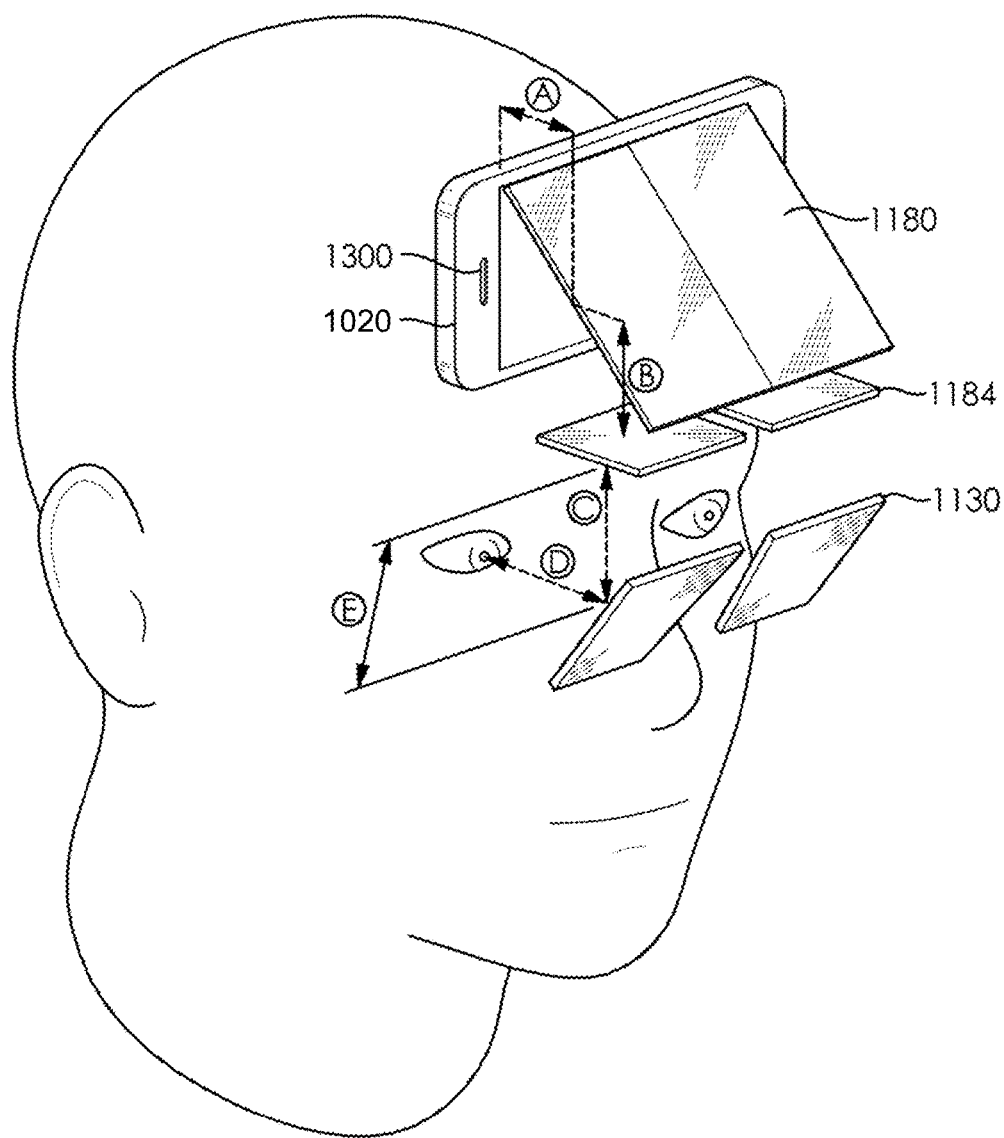
FIG. 13 illustrates several key relationships between the optical elements of the head mounted display of FIGS. 11A-C.

FIG. 13 illustrates several key relationships between the optical elements of HMD 1100. These relationships, labeled A, B, C, D and E are based on mobile device 1020 being tilted approximately 15 degrees outward, i.e. 15 degrees outward or downward from a vertical axis, i.e. away from the head. Tilting mobile device 1020 outward has several benefits including (1) making it easier for the viewer to place his/her mobile device inside housing 1110, and (2) moving the antenna of the mobile device further from the head, which offers the health advantage of diminishing the amount of radiation that reaches the head from mobile device 1020.

Label A refers to the distance between mobile device 1020 and reflecting surface 1180, which varies along the length of reflecting surface 1180.

Label B refers to the distance from reflecting surface 1180 to the plane defined by lens 1184. This distance, when added to the distance represented by Label A, i.e. A+B, corresponds to the length between mobile device 1020 and the center of lens 1184 respectively, and is optically equivalent to positioning mobile device 1020 directly above lenses 1184 at a distance of A+B. In one embodiment, A+B is approximately 75 mm, although ranges of 50-100 mm are desirable and other distances may also be acceptable.

It may further be appreciated that in this embodiment reflecting surface 1102 may be seen as the hypotenuse between mobile device 1020 and the plane formed by lens 1184.

While eyepiece 1030 acts as a secondary mirror in reflecting images emanating from mobile device 1020 and reflected by reflecting surface 1180 onto eyepiece 1030 to a viewers eye, the reverse is also the case, i.e. an image of the viewers eye is also reflected back onto mobile device 1020. The image of the viewer's eye can be continuously captured by a forward-facing camera, with a forward-facing lens 1300, that is present in many commercial smart phones and other mobile devices. This image can be analyzed by mobile device 1020 to determine which location, or approximate location on the display of mobile device 1020 the user is looking at. As such, the viewer's eye, or head, can act as a pointing device with respect to the display of mobile device 1020 and can be used as such in mobile applications. In addition, the viewer's eye movements may be analyzed for applications such as mood tracking and heart tracking.

Label C refers to the distance from lens 1184 to eyepiece 1130; and Label D refers to the distance from eyepiece 1130 to the eye of the viewer. To achieve proper focus of images in both directions, i.e. images from the display of mobile device 1120 directed to the eye and images of the eye directed to lens 1300, it is required that A+B approximately equal C+D. This is a unique property of HMD 1100 that is not offered by prior art head mounted displays. While it is ideal that the distances of A+B and C+D be as precisely equal as possible, tolerances in the range of 1-2 cm are acceptable.

Label E refers to a rectangle that encompasses the eyes, eyebrows and at least the lower portion of the forehead of the viewer. In certain embodiments, housing 1110 leaves area C on the face of viewer 1070 substantially unobstructed so that a person looking at viewer 1070 can see the viewer's facial features. Thus, the geometry that relates lens 1184, reflecting surface 1180 and mobile device 1020 allows housing 1110, which secures these elements, to rest high enough on the head of viewer 1070 so as not to obscure his/her facial features. Ideally, the only parts of HMD 1100 that drops below the midpoint on the viewer's forehead are eyepiece 1030 which is depicted as including a right eyepiece and a left eyepiece, and eyepiece holder 1116. In general, it is most desirable for the lower extent of housing 1110, which in this case refers to the lowest part of housing 1110 and excludes eyepiece 1030 and eyepiece holder 1116, to be at least 20 mm above the eyebrow of viewer 1070 while distances above the eyebrow in the range of 10-20 mm are also acceptable. Thus, in all configurations, the lower extent of housing 1110 is substantially above the eyebrows of viewer 1070.

It may be appreciated by one skilled in the art, that the foregoing objective of having housing 1110 of HMD rest substantially above the eyebrow also applies to certain embodiments of HMD 1, as described with reference to FIGS. 1A-B, 2A-B and 3A-B. Namely, the lower extent of housing 26, which for this discussion does not include eyepiece 40 or arm 305, rests above the viewer's eyebrows.

In a most preferred embodiment, lens 1184 has a focal length of approximately 100 millimeters, although ranges from 50 to 150 millimeters are desirable and other lengths may be acceptable. Here focal length refers to the distance from the lens to the display of mobile device 1020.

In one embodiment, the key relative angles between various elements of viewing assembly 1100 are given in Table 1 below.

TABLE 1

Relative Angles (in degrees) between elements of Viewing Assembly 1100

|  | Vertical Axis | Mobile Device 1020 | Lens 1184 | Eyepiece 1130 |
|---|---|---|---|---|
| Vertical Axis | — | — | — | — |
| Mobile Device 120 | 15 | — | — | — |
| Lens 1040 | 105 | 90 | — | — |
| Eyepiece 1030 | 60 | — | 60 | — |

Several other key relationships are achieved by HMD 1100 that enable it to achieve the objective of mounting on the forehead and thus enabling a viewers facial features to be visible to other persons. Some of these relationships are listed below:

Eye to lens distance. Generally, HMD 1100 is tolerant of a wider range of interpupilary distances, which varies among various persons. This is because of the large exit pupil of the lens. Only viewers at the ends of the IPD range may experience distortion of the edges of the display if their eyes are too far from the lens due to the center of the lens not being aligned with the center of the image.

Mirror angles. If the mirrors are not at the correct angle, the center of the image will be shifted up or down or side-to side, depending on the direction of the tilt.

Lens angle. To first order, this will have no effect, but the higher order effect of blurring the edges of the image parallel to the tilt axis will be noticeable.

Lens transverse displacement. if the lens is not in the correct transverse position, the image will be shifted, just as it would if the mirrors are not at the correct angle. This could lead to viewer fatigue.

Figure 14A:
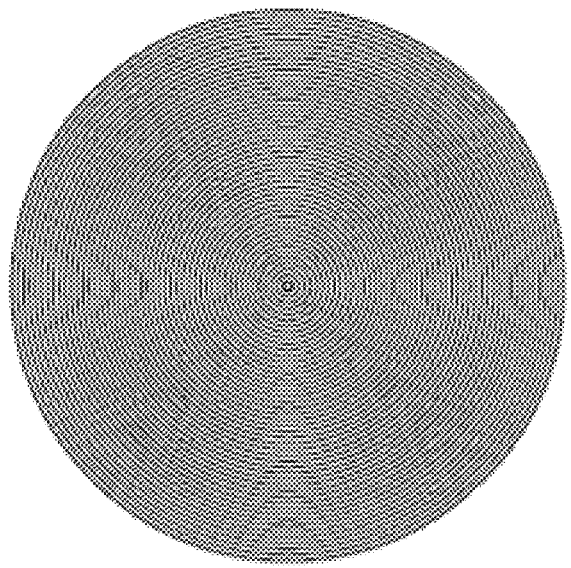
FIG. 14A depicts a typical Fresnel lens pattern.

FIG. 14A depicts a typical Fresnel lens pattern. A Fresnel lens has the advantage of allowing construction of lenses of large aperture and short focal length without the mass and volume of material that would be required by a lens of conventional design. A Fresnel lens can be made much thinner than a comparable conventional lens, in some cases taking the form of a flat sheet.

Figure 14B:
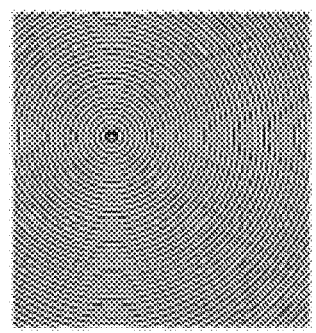
FIG. 14B illustrates the design of two side-by-side Fresnel lenses that may be used as a right lens and a left lens of the head mounted display.
Figure 14B:
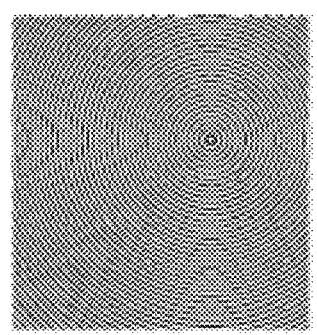

FIG. 14B illustrates the design of two side-by-side Fresnel lenses that may be used as right and left sides of lens 1184. When lens 1184 is implemented as two Fresnel lenses, they collimate and magnify light reflected by reflecting surface 1180 onto the right and left side of eyepiece 1130.

Figure 15A:
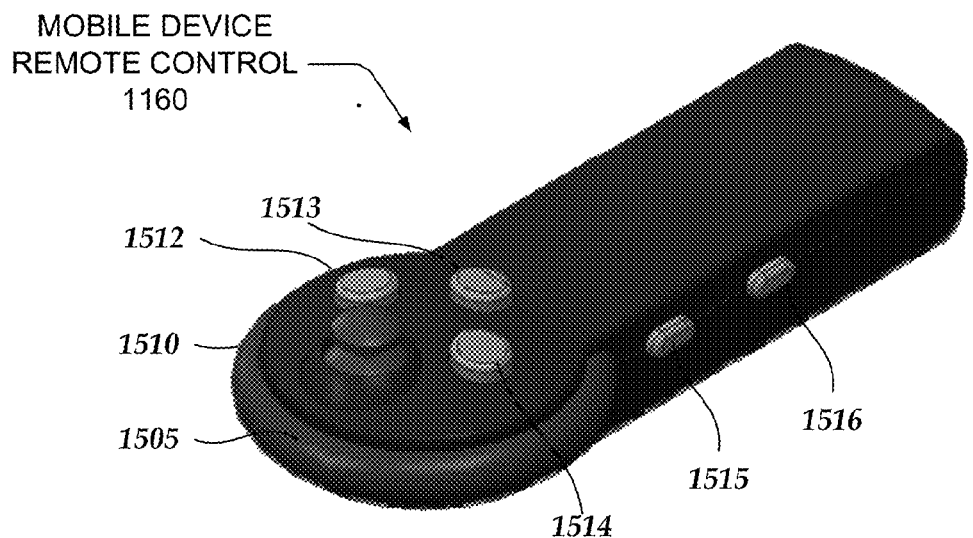
FIGS. 15A-B illustrate an embodiment of a mobile device remote control for the head mounted display.
Figure 15B:
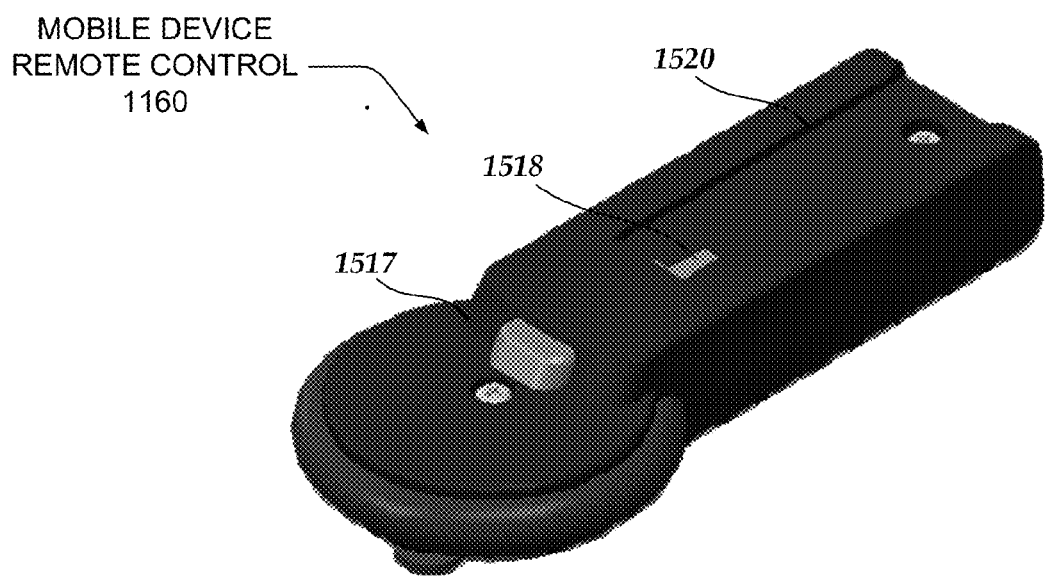

FIGS. 15A and 15B illustrate an embodiment of mobile device remote control 1160 for a head mounted display. Remote control 1160 may be used to send commands to mobile applications and may also be used as a marker to identify a position within a display area projected onto eyepiece 1130 from mobile device 1020. In certain embodiments remote control 1160 is a detachable mobile device that wirelessly sends commands and data to mobile device 1020 or to a personal computer or other electronics device that is suitably configured to receive the commands and data. Remote control 1160 includes a processor, a rechargeable battery, a wireless transceiver for sending and receiving commands and data, and several controls that a user may select. In certain embodiments, remote control 1160 also includes nontransitory memory and data storage for programs and data and one or more sensors including a gyroscope that measures angular velocity, an accelerometer that measures acceleration, a magnetometer that measures the Earth's magnetic flux field and a GPS to obtain absolute position information. In one embodiment, remote control 1160 includes a 9 axis motion sensor, which refers to a commercially available semiconductor chip or group of semiconductor chips that provide 3-axis gyroscope, accelerometer and magnetometer measurements. Wireless communications may include near field communications such as BLUETOOTH, BLUETOOTH Low Energy (LE), infrared, Wi-Fi, or any other practical method for communicating between remote control 1160 and mobile device 1020. In other embodiments remote control 1160 physically connects to mobile device 1020 through a USB cable or other connector in which case remote control 1160 includes an appropriate communications or network interface.

FIG. 15A is a simplified isometric illustration of remote control 1160 from a top perspective. Remote control 1160 includes a marker 1505 which in one embodiment is a LED capable of flashing or illuminating in a plurality of colors. In addition, remote control 1160 has a single-axis joystick 1510, referred to as joystick 1510 and three pushbuttons 1512-1514 on its top. In addition, remote control 1160 includes two additional pushbuttons 1515-1516 on its side and one pushbutton 1517 on its bottom, as illustrated in FIG. 15B. Remote control 1160 may include more or less or different controls within the scope of the present invention.

FIG. 15B is a simplified isometric illustration of remote control 1160 from a bottom perspective. In addition, to pushbutton 1517, the bottom of remote control 1160 also includes a guide rail 1520 and a latch 1518 that enable remote control 1160 to mount securely to HMD 1100 using mounting bracket 1108.

The various controls provided by remote control 1160 are intended to be conveniently operated by a viewer. For example, joystick 1510, and pushbuttons 1512-1514 are proximate to the thumb. Typically pushbutton 1512 is interpreted by a mobile application as a forward button that when activated issues a forward command, while pushbutton 1512 may be used as a backward button. Pushbutton 1517 is typically used in mobile applications as a control for triggering or selecting an action although it may be interpreted in other ways as well.

When a viewer operates selects and uses one of pushbuttons 1512-1517 or joystick 1510 remote control 1160 generates and transmits a corresponding wireless signal to mobile device 1020 that indicates the status or position of the buttons and joystick. Thus, mobile device 1020 receives a series of signals from remote control 1160 which it interprets as commands to a mobile application that is running and thus provides the corresponding status or position information to the mobile application.

In one embodiment, remote control 1160 also sends 9-axis motion data, i.e. x, y, z axis measurements from each of a gyroscope, accelerometer and magnetometer to mobile device 1020. This data may be processed to yield absolute position of remote control 1160.

In yet another embodiment, remote control 1160 broadcasts the 9 axis measurements to any electronic device suitably configured to receive the data. This enables other devices to identify the position of remote control 1160. This may be useful for multi-person games that use location information from multiple players.

Remote control 1160 also receives, via its wireless transceiver, commands for marker 1505. Such commands may include the color to emit, the duration of the illumination period, the intensity of the light, whether to flash, and the like.

It may be appreciated that whereas pushbuttons 510-511 and slider 520 operate mechanically and generate physical signal that is received by a touch sensitive screen of mobile device 50, pushbuttons 1512-1517 and joystick 1510 operate electronically and result in an electronic command being sent by remote control 1160 to mobile device 1020.

In one embodiment, two of pushbuttons 1512-1517 perform the same function as pushbuttons 510-511, namely to indicate a back and an enter, or select, command. In this embodiment, the discussion with reference to FIG. 7 applies with those two of pushbuttons 1512-1517 substituting for pushbuttons 510-511 and joystick 1510 substituting for slider 520.

It may be appreciated by one skilled in the art that a single-axis joystick, such as joystick 1510, which may configured so that it may be either pushed up and down, or pushed left and right, is simpler to operate than a two-axis joystick. However, in other embodiments a two-axis joystick or other pointing device may be used. Further, pushbuttons 510-511 may be replaced by other mechanisms that send a binary signal without departing from the scope and intent of the subject invention.

Figure 16:
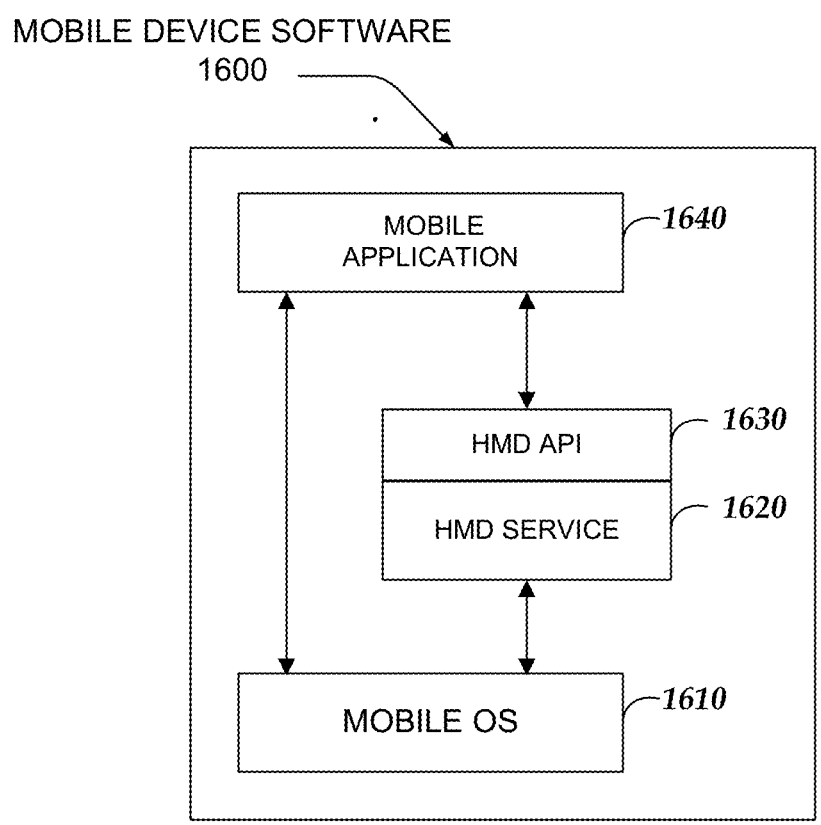
FIG. 16 illustrates a simplified embodiment of mobile device software that runs in a mobile device.

FIG. 16 illustrates a simplified embodiment of mobile device software 1600 that runs in mobile device 1020. Mobile device software 1600 includes a mobile operating system (OS) 1610 that provides a range of functions required to run a variety of mobile applications 1640. Typically mobile OS 1610 is provided by the manufacturer of mobile device 1020. For example, APPLE COMPUTER provides the mobile operating system named IOS for its IPHONE smart phone product line and SAMSUNG provides the ANDROID mobile operating system for its smart phone product line. Mobile OS 1610 provides mobile device 1020 with mobile communications capabilities, display and user interaction capabilities.

Mobile applications developed to work with HMD 1000 access a variety of features through a HMD application programming interface (API) 1630. HMD API 1630 functions are provided by a software layer referred to as a HDM service 1620. HDM API 1630 provides access to capabilities including obtaining the status of joystick 1510, obtaining the status of controls 1512-1516, obtaining the current position of remote control 1160, turning marker 1505 on and off and setting the color of marker 1505. The applications may also access features of additional computing devices nearby to provide additional input or output functionalities, both for the purposes of development, and for application purposes.

FIGS. 17A-B and 18A-B depict alternative optical assembly configurations for head mounted display (HMD) 1000. These offer the advantage of lighter weight as compared to HMD 1100 as HMD 1100 requires a larger, heavy lens in the optical center of the device to focus images, whereas HMD 1800 has a slimmer lens because of the optical work being performed by the eyepiece, which must be moved based on the user's interpupilary distance. Further, the height of HMD 1800 is reduced compared to HMD 1100. Further, the total volume of HMD 1800 is less than the total volume of HMD 1700. Further, the positioning of the mobile device's typical camera position in HMD 1800 is amenable to a smaller mirror or set of mirrors to provide a view in front of the user.

Figure 17A:
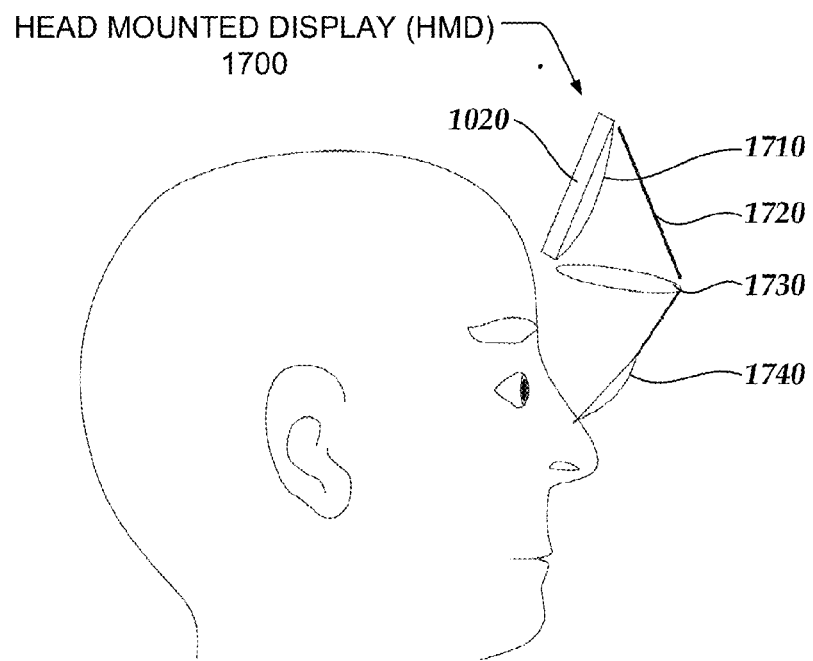
FIGS. 17A-B depict an alternative optical assembly configuration for the head mounted display of FIG. 10 in which a mobile device is maintained in an approximately vertical position.

FIG. 17A depicts an alternative optical assembly configuration for head mounted display (HMD) 1000 in which mobile device 1020 is maintained in an approximately vertical position, a field lens 1710 is mounted in close proximity to the display of mobile device 1020 and in which a middle optical element 1730, i.e. midway in optical distance between the eye and the mobile device, may be a prism or other optical element and not necessarily a lens. Field lens 1710 is mounted either directly on top of the display of mobile device 1020 or in close proximity thereto. The focused image is then reflected off a reflecting surface 1720, through a middle optical element 1730 onto an eyepiece 1740. Because image focusing is performed by field lens 1710, a light weight optical element such as a prism may be used to implement middle optical element 1730. The primary function of middle element 1730 is to refract the light reflected from reflecting surface 1720 onto eyepiece 1740 in the correct position for viewing by a viewer wearing HMD 1700.

Figure 17B:
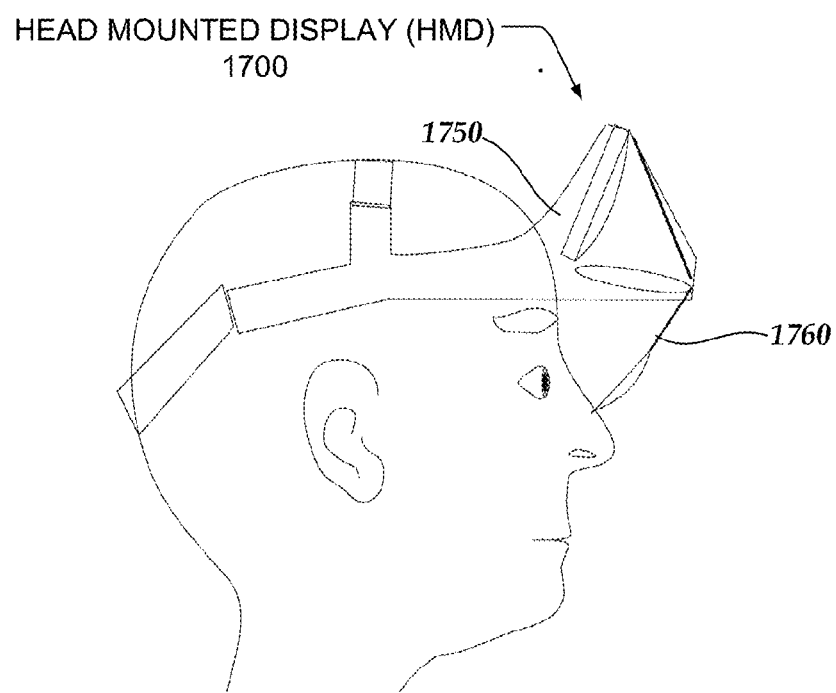

FIG. 17B illustrates an embodiment of a housing that secures the optical assembly elements of HMD 1700. A housing 1750 secures each of the elements of the optical assembly, with the possible exception of eyepiece 1740. An eyepiece holder 1760 secures eyepiece 1740 to housing 1750 in this embodiment; although in other embodiments, eyepiece 1760 may be equipped with a frame that is independent and not connected to housing 1750. For example, in certain embodiments eyepiece holder 1760 may similar to the frame of corrective or sun-glasses that secures eyepiece 1740 to the head of the viewer by resting on his/her ears.

Figure 18A:
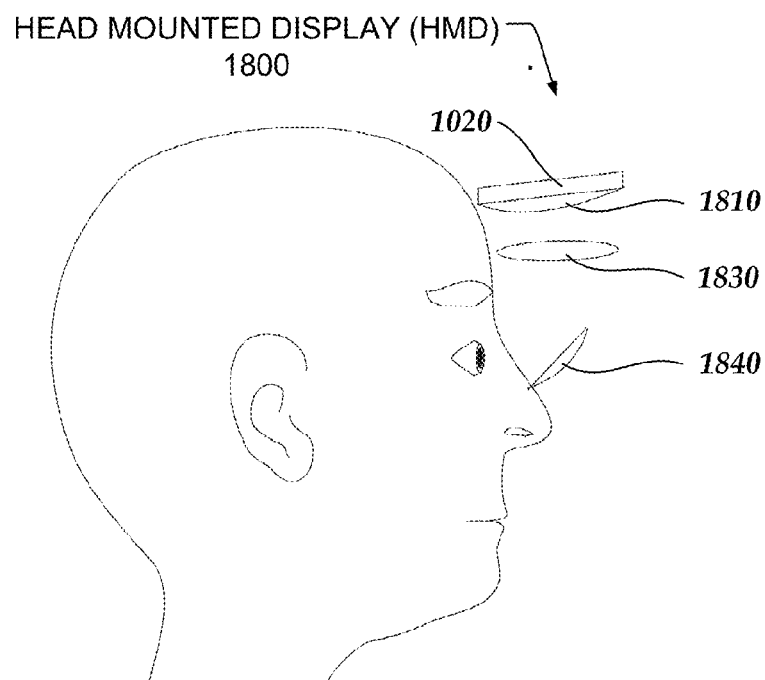
FIGS. 18A-B depict an alternative optical assembly configuration for the head mounted display of FIG. 10 in which a mobile device is maintained in an approximately horizontal position.

FIG. 18A depicts an alternative optical assembly configuration for head mounted display (HMD) 1000 in which mobile device 1020 is maintained in an approximately horizontal, or downward-facing, position. A field lens 1810 is mounted in close proximity or on top of the display of mobile device 1020, and a middle optical element 1830 is positioned midway in optical distance between the eye and the mobile device. Middle optical element 1830 may be a prism or other optical element and is not necessarily a lens. An image displayed by mobile device 1020 passes through field lens 1810 and then through middle optical element 1830 onto an eyepiece 1840. Because image focusing is performed by field lens 1810, a light weight optical element such as a prism may be used to implement middle optical element 1830, thus reducing the weight of HMD 1800. Further, because the display of mobile device 1020 is facing downward a reflecting surface such as reflecting surface 1720 of HMD 1700 is not necessary. The primary function of middle element 1830 is to refract the light emanating from the display of mobile device 1020 onto eyepiece 1840 in the correct position for viewing by a viewer wearing HMD 1800.

Figure 18B:
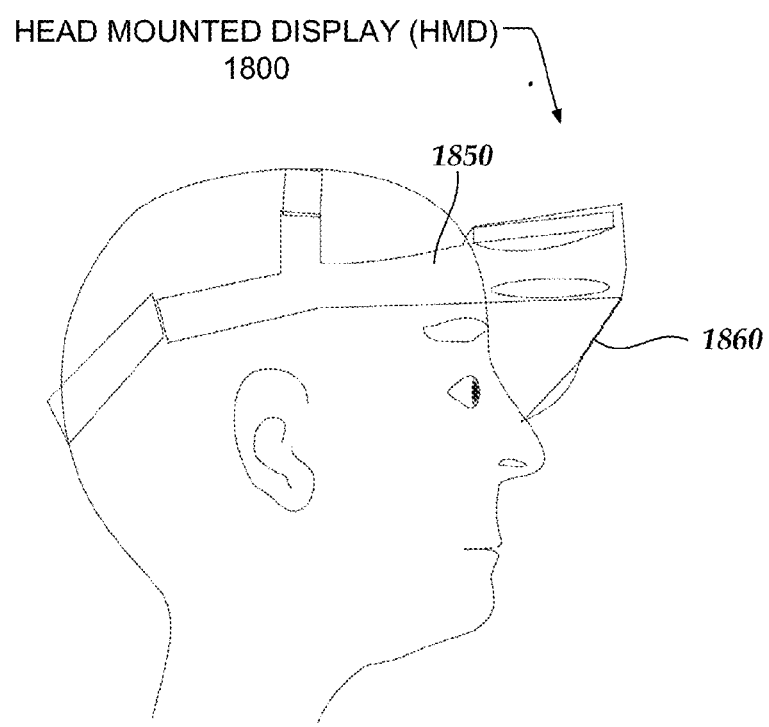

FIG. 18B illustrates an embodiment of a housing that secures the optical assembly elements of HMD 1800. A housing 1850 secures each of the elements of the optical assembly, with the possible exception of eyepiece 1840. An eyepiece holder 1860 secures eyepiece 1840 to housing 1850 in this embodiment; although in other embodiments of HMD 1800 eyepiece 1860 may independent of and not connected to housing 1850. For example, eyepiece holder 1860 may be a frame similar to that or corrective glasses that secures eyepiece 1840 to the head of the viewer by resting on his/her ears.

HMD 1700 and HMD 1800, described hereinabove, may be equipped with other elements and features described with reference to HMD 1000 and HMD 1100, such as a remote control, periscope, half-silvering of the eyepiece, and the like. In general, the structure and features of a head mounted display apparatus, according to the embodiments referred to as HMD 1100, HMD 1700 and HMD 1800, may be arbitrarily combined with each other to yield an embodiment that is within the scope and spirit of the subject invention.

In reading the above description, persons skilled in the art will realize that there are many apparent variations that can be applied to the methods and systems described.

What is claimed is:

1. A head mounted display device, comprising:
a housing;
a mobile device, secured by the housing, which fits on the head of a human viewer, comprising a forward-facing side with a display and a backward-facing side, and a camera with a camera lens on the backward-facing side;
a reflecting surface, connected to the housing, that reflects images displayed by the mobile device;
a lens, connected to the housing, that focuses images reflected by the reflecting surface, and
an eyepiece, connected to the housing, onto which the images from the lens focus for display to the viewer;
a periscope, connected to the housing, that reflects light emanating substantially from the field of view of the viewer onto the camera lens, enabling the mobile device to receive images from the field of view of the viewer; and
a remote control, comprising:
a plurality of controls operable by the viewer, and
a wireless transceiver for communicating with the inserted mobile device;
wherein the mobile device further comprises:
a processor; and
a memory in communication with the processor for storing instructions, which when executed by the processor, cause the mobile device:
to receive images from the camera; and
to determine, based on the received images, the location of the remote control within the field of view of the viewer.

2. The device of claim 1 wherein the remote control is detachably connected to the housing such that it can be detached from the housing by the viewer and operated by hand.

3. The device of claim 1 wherein the remote control further comprises:
a housing; and
a battery.

4. The device of claim 3 wherein at least one of the plurality of controls is selected from the group consisting of forward, backward, and select.

5. The device of claim 3 further comprising an LED capable of emitting light and wherein the remote control is capable of receiving a signal from the mobile device to illuminate the LED.

6. The device of claim 5 wherein the remote control is further capable of receiving a command that specifies the color of light to emit when the LED is illuminated.

7. The device of claim 3 wherein the remote control further comprises at least one sensor for determining the geographic position of the remote control.

8. The device of claim 7 wherein the at least one sensor is selected from the group consisting of an accelerometer, a gyroscope and a magnetometer.

9. The device of claim 7 wherein the at least one sensor comprises an accelerometer, a gyroscope and a magnetometer and wherein the remote control transmits a signal that comprises sensor data that specifies its absolute position.

10. A system for integrating a head mounted display with a mobile device comprising:
a mobile device with a forward-facing side and a backward-facing side comprising:
a display screen on the forward-facing side;
a camera with a camera lens on the backward-facing side;

a head mounted display comprising:
- a housing that secures the mobile device, which fits on the head of a human viewer;
- a reflecting surface, connected to the housing, that reflects images displayed by the display screen;
- an eyepiece, connected to the housing, onto which the images from the mobile device display to the viewer; and
- a periscope, connected to the housing, that reflects light emanating substantially from the field of view of the viewer onto the camera lens, enabling the mobile device to receive images from the field of view of the viewer; and a remote control for the mobile device comprising:
- a plurality of controls operable by the viewer each control having a state; and
- a wireless transceiver for communicating with the mobile device; and wherein the mobile device further comprises:
- a processor; and
- a memory in communication with the processor for storing instructions, which when executed by the processor, cause the mobile device:
  - to receive status updates that specify the state of each of the plurality of controls; and
  - to provide the status updates to a mobile application that runs in the mobile device;
  - to receive images from the camera;
  - to determine, based on the received images, the location of the remote control within the field of view of the viewer; and
  - to provide the location of the remote control to the mobile application.

11. The system of claim 10 wherein at least one of the plurality of controls is selected from the group consisting of forward, backward, and select.

12. The system of claim 10 wherein the remote control further comprises an LED capable of emitting light and wherein the remote control is capable of receiving a signal from the mobile device to illuminate the LED.

13. The system of claim 11 wherein the remote control is further capable of receiving a command that specifies the color of light to emit when the LED is illuminated.

14. The system of claim 10 wherein the remote control further comprises at least one sensor for determining geographic position.

15. The system of claim 14 wherein the at least one sensor is selected from the group consisting of an accelerometer, a gyroscope and a magnetometer and wherein the remote control transmits a signal that comprises sensor data that specifies its absolute position.

16. The system of claim 15 wherein the mobile device receives the sensor data and the instructions, which when executed by the processor, further cause the mobile device to provide a specification of the absolute position of the remote control to the mobile application.

17. The system of claim 10 wherein the remote control is detachably connected to the housing such that it can be detached from the housing by the viewer and operated by hand.

* * * * *